(12) United States Patent
Adaniya et al.

(10) Patent No.: US 7,652,405 B2
(45) Date of Patent: *Jan. 26, 2010

(54) PERMANENT MAGNET EMBEDMENT ROTATING ELECTRIC MACHINE, MOTOR FOR CAR AIR CONDITIONER, AND ENCLOSED ELECTRIC COMPRESSOR

(75) Inventors: Taku Adaniya, Kariya (JP); Minoru Mera, Kariya (JP); Kiyoshi Uetsuji, Kariya (JP); Ai Saeki, Kariya (JP); Masatoshi Kobayashi, Kariya (JP); Hiroshi Fukasaku, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 372 days.

This patent is subject to a terminal disclaimer.

(21) Appl. No.: 11/713,110

(22) Filed: Feb. 27, 2007

(65) Prior Publication Data

US 2007/0200447 A1     Aug. 30, 2007

(30) Foreign Application Priority Data

Feb. 28, 2006   (JP)   ............................. 2006-054092

(51) Int. Cl.
  *H02K 1/27*  (2006.01)
(52) U.S. Cl. ...................... 310/216.055; 310/156.53; 310/156.56; 310/156.57
(58) Field of Classification Search ............ 310/156.08, 310/156.38, 156.46, 156.53, 156.56, 156.57, 310/216, 216.055
  See application file for complete search history.

(56) References Cited

U.S. PATENT DOCUMENTS

| | | | |
|---|---|---|---|
| 6,262,508 B1 * | 7/2001 | Shibayama et al. ......... | 310/181 |
| 6,486,581 B2 * | 11/2002 | Miyashita et al. ...... | 310/156.53 |
| 6,597,079 B2 * | 7/2003 | Miyashita et al. ...... | 310/156.48 |
| 6,759,776 B2 | 7/2004 | Takahata et al. | |
| 6,759,777 B2 | 7/2004 | Takahata et al. | |
| 6,919,663 B2 * | 7/2005 | Iles-Klumpner ....... | 310/156.53 |
| 2004/0256940 A1 * | 12/2004 | Tsuruta et al. ......... | 310/156.53 |
| 2006/0250041 A1 * | 11/2006 | Adaniya et al. ........ | 310/156.53 |
| 2007/0257576 A1 * | 11/2007 | Adaniya et al. ........ | 310/156.53 |

FOREIGN PATENT DOCUMENTS

| | | |
|---|---|---|
| JP | 05-191936 | 7/1993 |
| JP | 07-222384 | 8/1995 |
| JP | 2000-197292 | 7/2000 |
| JP | 2001-69701 | 3/2001 |
| JP | 2002-95194 | 3/2002 |
| JP | 2002-136011 | 5/2002 |
| JP | 2003-136011 | 5/2002 |
| JP | 2004-260972 | 9/2004 |
| JP | 2005-86955 | 3/2005 |

* cited by examiner

*Primary Examiner*—Tran N Nguyen
(74) *Attorney, Agent, or Firm*—Locke Lord Bissell & Liddell LLP

(57) ABSTRACT

A plurality of convex portions are located inside of a virtual circumferential surface. Each convex portion connects an adjacent pair of circumferential portions with each other. Each convex portion is an arcuate curve bulging radially outward. Each convex portion defines a minimum radius. A difference between a radius R and the minimum radius is a depth Dh. Dhr=Dh×25.5/R. A range of an angular width A in relation to circumferential portion and a range of the depth Dh are set by the following expression, $$(5.6 \times Dhr + 11.3)° \times 6/p \leq A < 35° \times 6/p$$

and $$A < [360/p - 2 \times \arccos]° \quad (1)$$

Therefore, decrease in torque is prevented. Torque pulsation is suppressed.

20 Claims, 11 Drawing Sheets

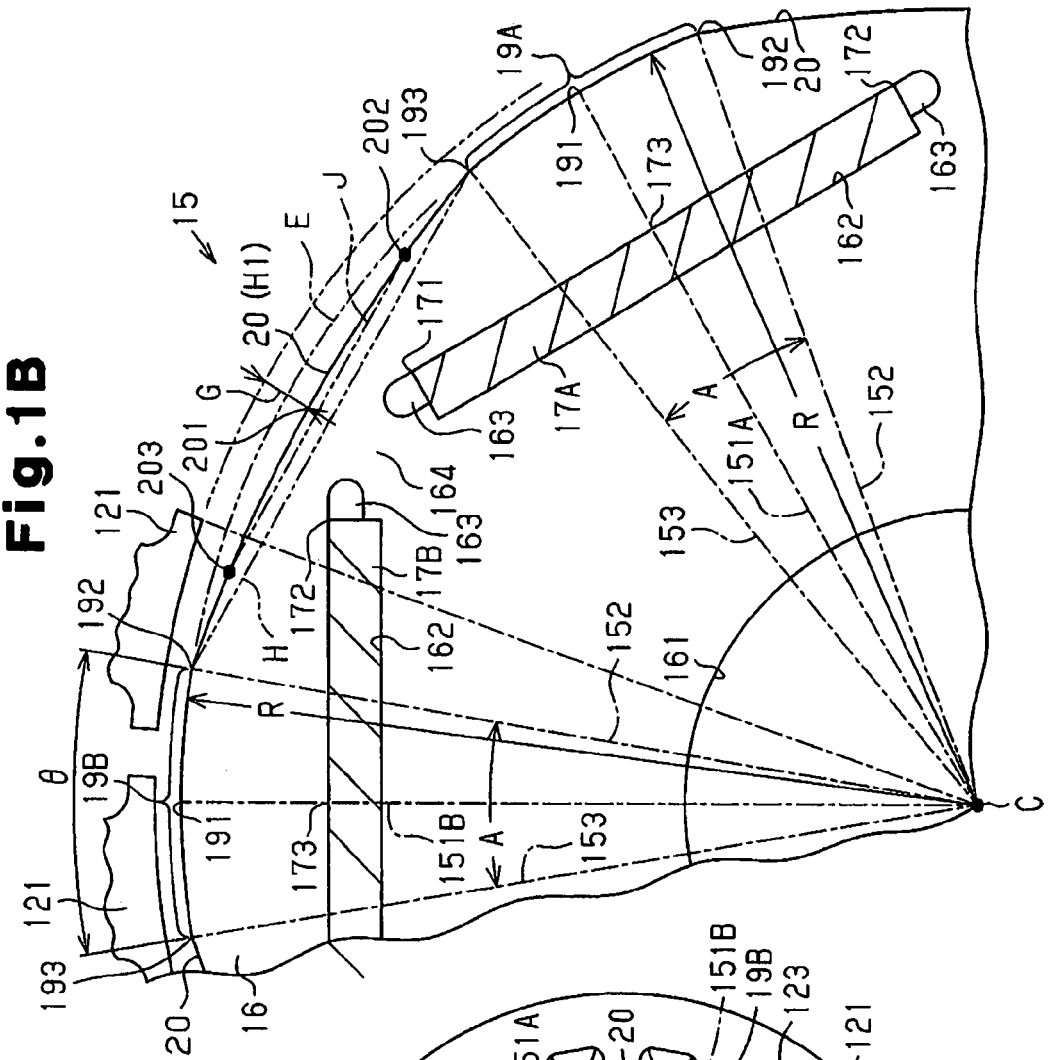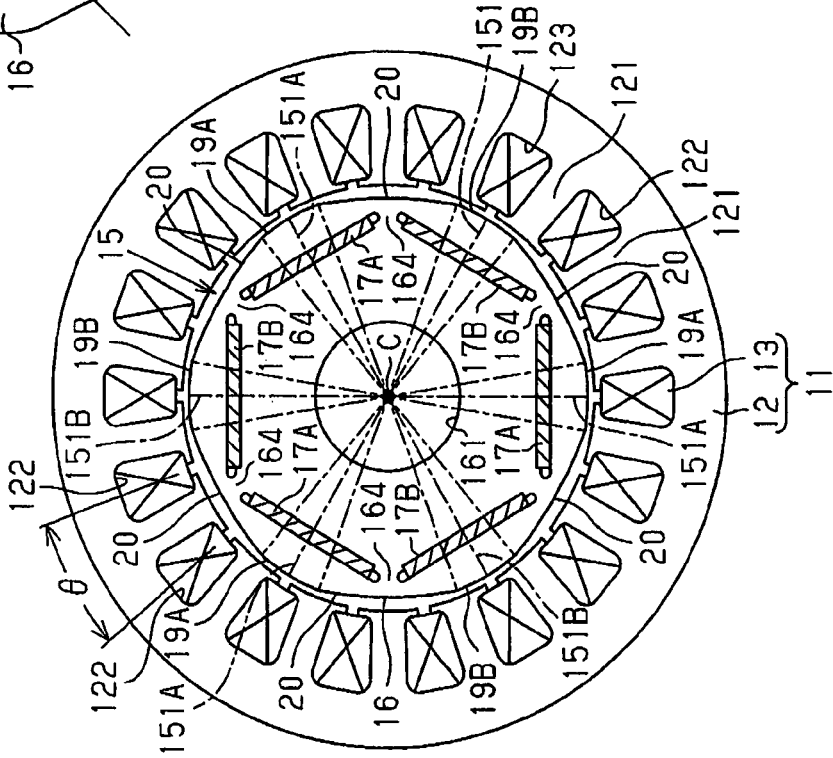

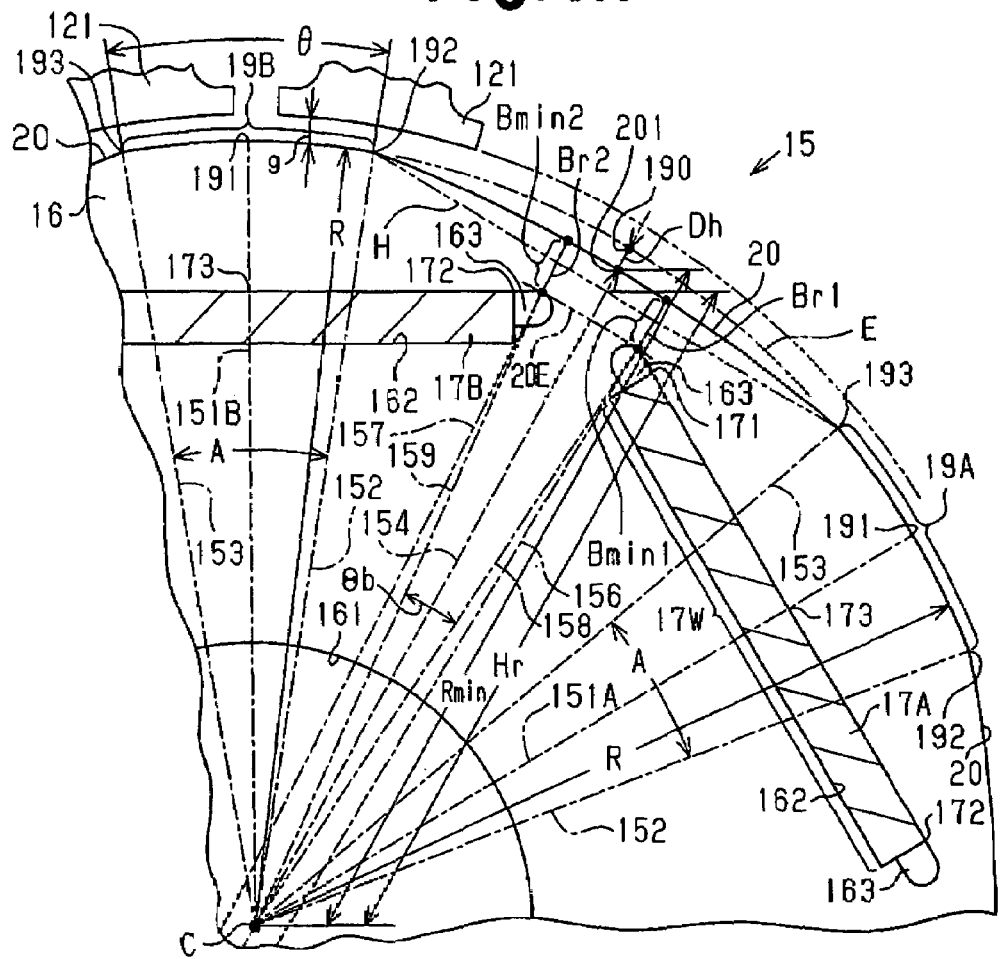
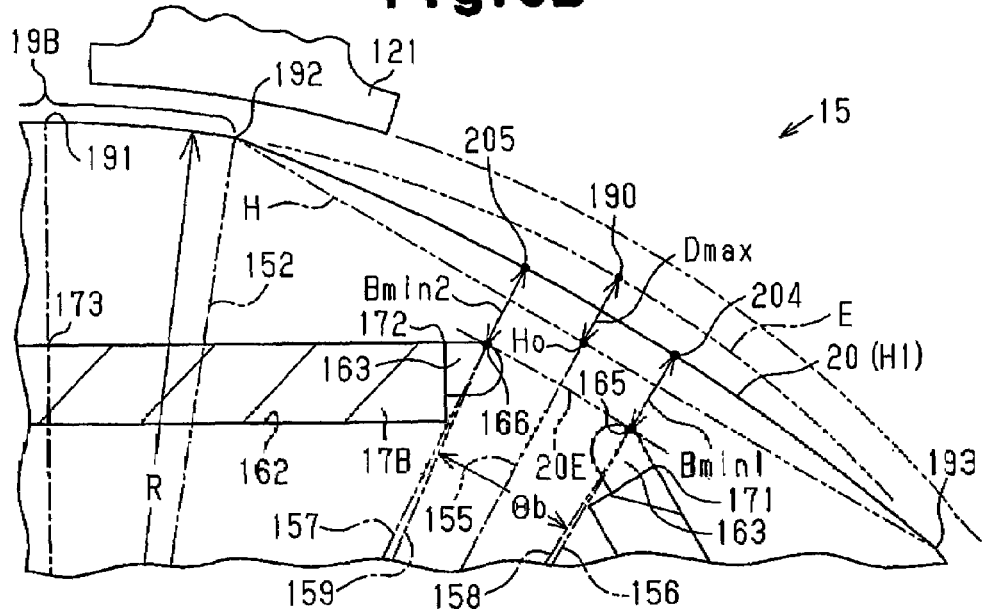

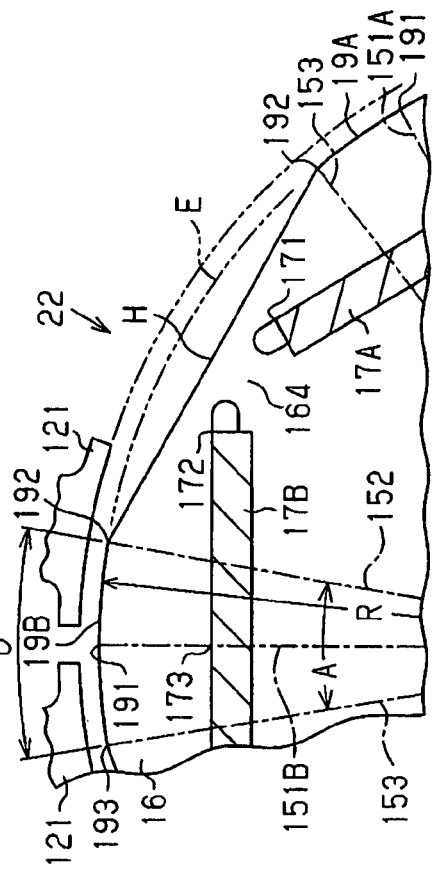
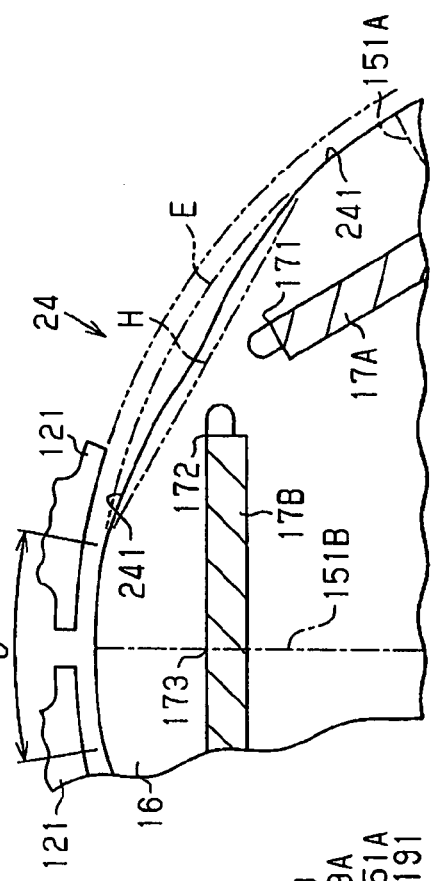
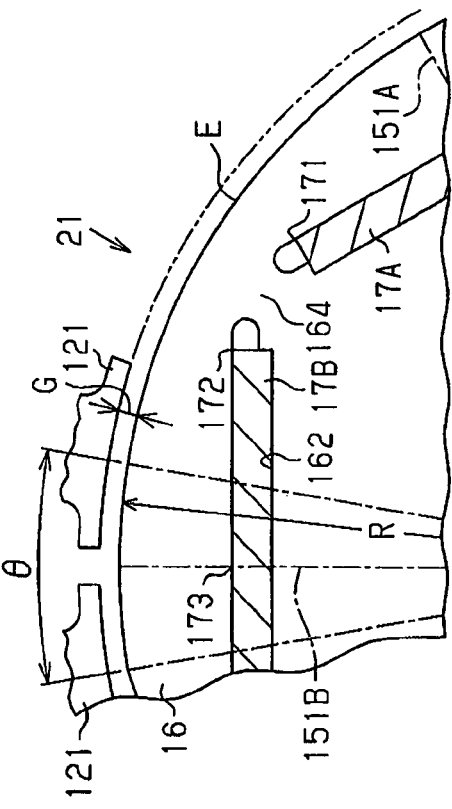
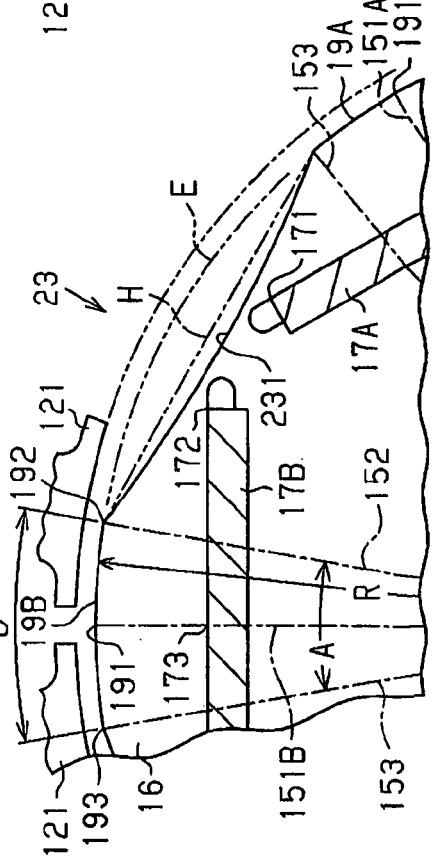

PERMANENT MAGNET EMBEDMENT ROTATING ELECTRIC MACHINE, MOTOR FOR CAR AIR CONDITIONER, AND ENCLOSED ELECTRIC COMPRESSOR

BACKGROUND OF THE INVENTION

The present invention relates to a permanent magnet embedment rotating electric machine in which a plurality of permanent magnets are embedded as magnetic poles inside a rotor that rotates in a stator around which windings are wound. The present invention also relates to a motor for a car air conditioner incorporating such a rotating electric machine and to an enclosed electric compressor.

A plurality of permanent magnets are embedded inside the rotor of this type of rotating electric machine so as to be adjacent to each other in the circumferential direction of the rotor. Two permanent magnets adjacent to each other in the circumferential direction of the rotor are set so that the magnetic poles are differently arranged. Since sudden magnetic flux density fluctuation occurs at a location (magnetic pole switching part) between the two adjacent permanent magnets, torque pulsation occurs and causes vibration and noise in the rotating electric machine.

Japanese Laid-Open Patent Publication No. 2001-69701 describes a motor having a rotor of which the radius becomes minimal at a location (magnetic pole switching part) between two permanent magnets that are adjacent to each other in the circumferential direction to suppress the torque pulsation. Further, the rotor has an outer circumference with a sinusoidal wave shape so that the radius of the rotor becomes maximal at the central portion (magnetic pole center) of each permanent magnet.

Japanese Laid-Open Patent Publication No. 2002-95194 describes a motor having a rotor of which the radius becomes minimal at a location between two adjacent permanent magnets (magnetic pole switching portion) in the circumferential direction and becomes maximal at the magnetic pole center. This is achieved by projecting the portion corresponding to the magnetic center on the outer circumference of the rotor outward into the shape of an arc.

Japanese Laid-Open Patent Publication No. 2002-136011 describes a motor having a portion corresponding to a magnetic pole center along the outer circumference of a rotor shaped as a circumferential portion, which is coaxial with the rotor. Further, in the outer circumference of the rotor, the portion corresponding to two adjacent permanent magnets is groove-shaped.

However, in the motors of Japanese Laid-Open Patent Publication No. 2001-69701 and Japanese Laid-Open Patent Publication No. 2002-95194, the location where the gap between the teeth of the stator and the outer circumference of the rotor becomes minimal is only the point-like portion corresponding to the magnetic pole center of the outer circumference in the side cross-section of the rotor. A torque constant (output torque per unit current) of the motor in the two publications thus becomes small compared to when the outer circumference radius of the rotor is constant.

In the motor of Japanese Laid-Open Patent Publication No. 2002-136011, the gap between the teeth of the stator and the outer circumference of the rotor greatly changes between the circumferential portion and the groove-shaped portion. Thus, the prevention of torque pulsation becomes difficult. When the groove is deep, the torque constant of the motor in Japanese Laid-Open Patent Publication No. 2002-136011 becomes further smaller than the torque constant of the motor in Japanese Laid-Open Patent Publication No. 2001-69701 and Japanese Laid-Open Patent Publication No. 2002-95194.

SUMMARY OF THE INVENTION

An objective of the present invention is to provide a permanent magnetic embedment rotating electric machine capable of preventing decreases in torque, and further of suppressing torque pulsation, torque ripple, i.e., degree of fluctuation width of output torque.

According to one aspect of the invention, a permanent magnet embedment rotating electric machine is provided. The rotating electric machine includes an annular stator; a plurality of teeth arranged on an inner circumference of the stator. A slot is defined between each adjacent pair of the teeth. Each of a plurality of coils is arranged in one of the slots. A rotor is located inside of the stator. The rotor defines a rotational axis, a virtual circumferential surface about the rotational axis, and an outer circumference. The outer circumference has a plurality of circumferential portions. The circumferential portions are included in the virtual circumferential surface. Each of the circumferential portions defines an angular width A and a radius R relative to the rotational axis. A plurality of permanent magnets are embedded inside the rotor. The permanent magnets defines a number of poles p. Each of the permanent magnets has a magnetic pole center. Each of the circumferential portions corresponds to the magnetic pole center. The circumferential portions, which correspond to the permanent magnets, respectively, are spaced from each other. A plurality of convex portions are located inside of the virtual circumferential surface. Each convex portion connects an adjacent pair of the circumferential portions with each other. Each convex portion is an arcuate curve bulging radially outward. Each convex portion defines a minimum radius. The minimum radius is a minimum value of a distance between the rotational axis and the convex portion. The difference between the radius R and the minimum radius is a depth Dh. Dhr=Dh×25.5/R. A range of the angular width A and a range of the depth Dh are set by the following expression (1), $$(5.6 \times Dhr + 11.3)° \times 6/p \leq A < 35° \times 6/p$$

and $$A < [360/p - 2 \times arccos(1 - Dhr/25.5)]° \quad (1)$$

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1A is a front cross-sectional view of a stator and a rotor of a motor according to a first embodiment embodying the present invention;

FIG. 1B is a partially enlarged front cross-sectional view of FIG. 1A;

FIGS. 7(a2), 7(b2), 7(c2), 7(d2), 7(e2), and 7(f2) are graphs showing FEM (Finite Element Method) analysis examples of changes in the sum of magnetic fluxes at all the teeth when the angular range A is changed.

FIG. 9A is a partial cross-sectional view.

FIG. 9B is a partially enlarged cross-sectional view.

FIG. 12A is a partial front cross-sectional view showing a first comparative rotor 21;

FIG. 12B is a partial front cross-sectional view showing a second comparative rotor 22;

FIG. 12C is a partial front cross-sectional view showing a third comparative rotor 23;

FIG. 12D is a partial front cross-sectional view showing a fourth comparative rotor 24;

DETAILED DESCRIPTION OF THE PREFERRED EMBODIMENTS

A first embodiment of the present invention will now be described with reference to FIGS. 1 to 12D.

Figure 2:
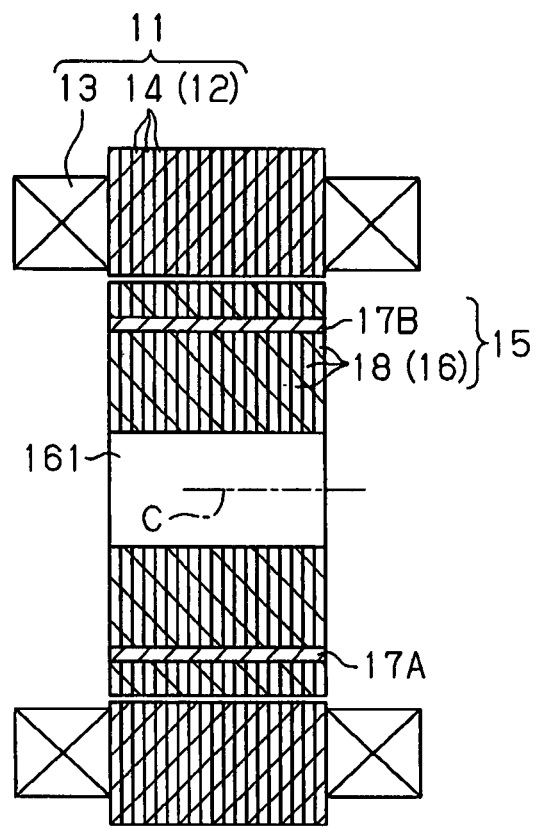
FIG. 2 is a front cross-sectional view of the stator and the rotor of FIG. 1A.

As shown in FIG. 1A, a stator 11 includes an annular stator core 12 and a coil 13 arranged in slots 122 formed between a plurality of teeth 121 arranged along the inner periphery of the stator core 12. In the present embodiment, the quantities of the teeth 121 and slots 122 are each eighteen. The slots 122 are arranged at an equal pitch (equiangular pitch) in the circumferential direction of the annular stator 11. As shown in FIG. 2, the stator core 12 is formed by stacking a plurality of core plates 14, which are magnetic bodies (steel plates). The coil 13 arranged in the slot 122 is wound into a wave winding.

Generally, the following relational equation is satisfied when expressing the number of poles as p (integer), the number of phases as m (integer), the number of slots per phase for each pole as q (every 0.5, such as q=0.5, 1, 1.5, 2, 2.5, . . . ), and the number of slots of the stator as K.

$$K = q \times p \times m$$

For instance, in a case in which there are three phases and q=1, the relationship between the number of slots K and the number of poles p is four poles and twelve slots, six poles and eighteen slots, eight poles and twenty-four slots, and so on. In a case in which there are three phases and q=1.5, the relationship between the number of slots K and the number p of poles is four poles and eighteen slots, six poles and twenty-seven slots, eight poles and thirty-six slots, and so on.

Figure 3:
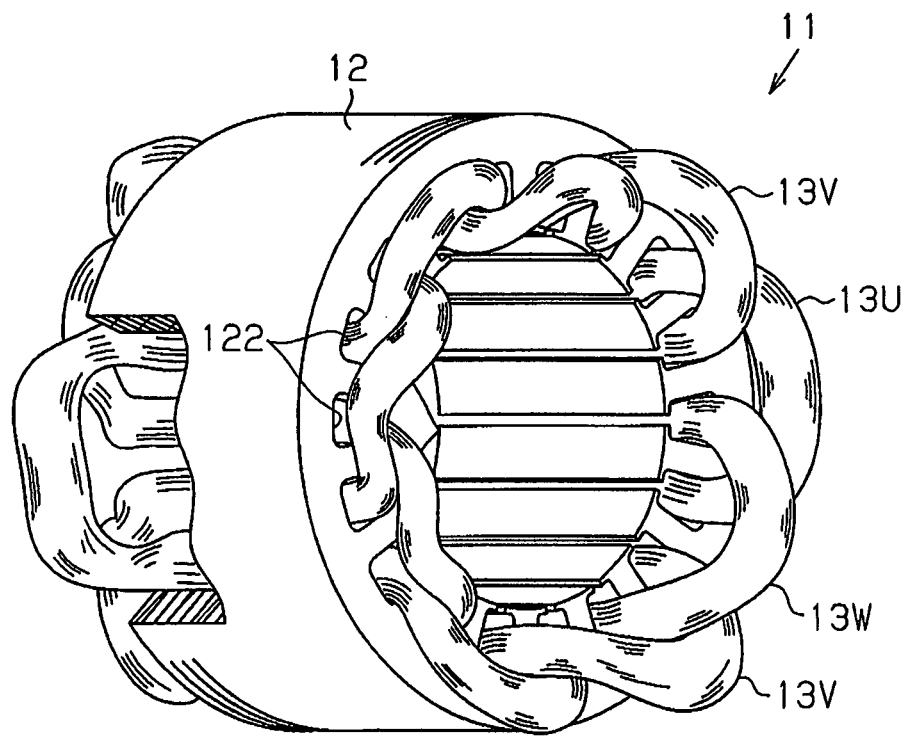
FIG. 3 is a perspective view of the stator of FIG. 1A.
Figure 4:
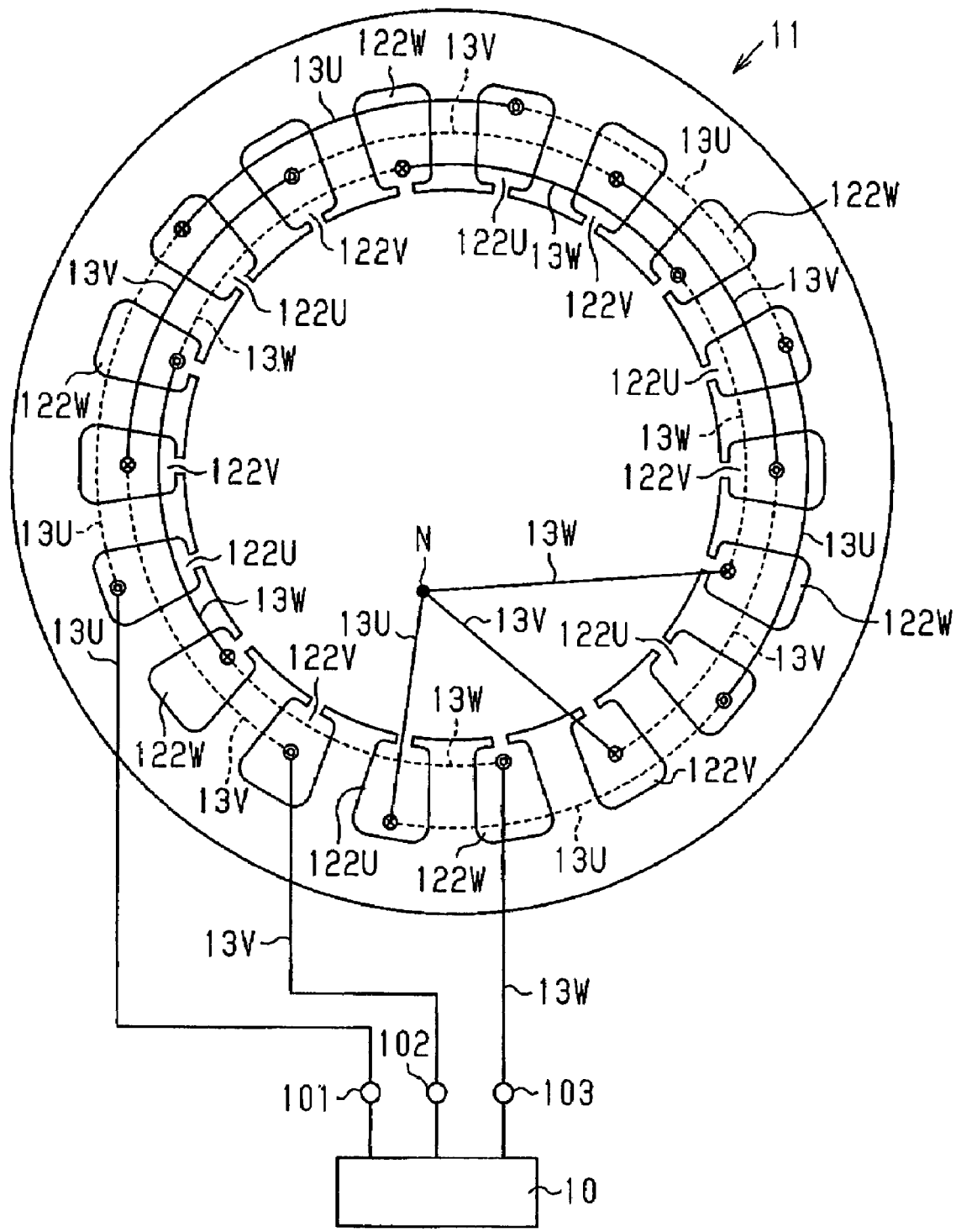
FIG. 4 is a view showing a wave winding of the windings in the stator of FIG. 1A.

The wave winding for six poles and eighteen slots will be described with reference to FIGS. 3 and 4. In the wave winding of the stator 11, a U-phase coil (indicated by reference character 13U), which is connected to a U-phase terminal 101 of an inverter 10, extends through a group of first slots (indicated by reference character 122U). A V-phase coil (indicated by reference character 13V), which is connected to a V-phase terminal 102 of the inverter 10, extends through a group of second slots (indicated by reference character 122V), and a W-phase coil (indicated by reference character 13W), which is connected to the terminal 103 of the W-phase of the inverter 10 extends through a group of third slots (indicated by reference character 122W). The portions of the coils 13U, 13V, 13W shown by solid lines in FIG. 4 indicates coil portions on the end face of the stator 11 that can be seen in this drawing. The portions of the coils 13U, 13V, and 13W shown by broken lines in FIG. 4 indicate the coil portions on the opposite end face of the stator 11 that cannot be seen in this drawing. The joined part of the solid line portion and the broken line portion of the coils 13U, 13V, and 13W extends through the slots 122U, 122V, and 122W. The reference character N indicates a neutral point connecting the terminating ends of each coil 13U, 13V, 13W.

As shown in FIG. 1A, a rotor 15 includes a rotor core 16 and a plurality of flat permanent magnets 17A, 17B (six in the present embodiment) embedded in the rotor core 16. The plurality of permanent magnets 17A, 17B all have the same shape and the same size. As shown in FIG. 2, the rotor core 16 is formed by stacking a plurality of core plates 14 made of magnetic bodies (steel plates). A shaft hole 161 extends through the center of the rotor core 16. An output shaft (not shown), which extends through the shaft hole 161, is fixed to the rotor core 16.

As shown in FIG. 1A, plural sets of the first permanent magnet 17A and the second permanent magnet 17B are fitted into accommodating holes 162 extending through the rotor core 16 parallel to the shaft hole 161. The permanent magnets 17A, 17B are embedded in the rotor core 16 as magnetic poles that are adjacent in the circumferential direction of the rotor 15. The magnetic poles of two permanent magnets 17A, 17B adjacent in the circumferential direction of the rotor 15 differ from each other. That is, the permanent magnets 17A, 17B are embedded so as to alternately have different polarities in the circumferential direction.

Each permanent magnet 17A, 17B includes a first magnetic pole end 171, a second magnetic pole end 172, and a magnetic pole center 173 located between the first magnetic pole end 171 and the second magnetic pole end 172. A radial line 151A of the rotor 15 extending through the flat magnetic pole center 173 of the permanent magnet 17A is orthogonal to the permanent magnet 17A. Similarly, a radial line 151B of the rotor 15 extending through the flat magnetic pole center 173 of the permanent magnet 17B is orthogonal to the permanent magnet 17B. The radial lines 151A, 151B connecting to the rotational axis C of the rotor 15 are spaced by equiangular intervals (60°) about the rotational axis C. The permanent magnets 17A, 17B are spaced from the rotational axis C of the rotor 15 by an equal distance. Further, the permanent magnets 17A, 17B are arranged at an equal pitch in the circumferential direction of the rotor 15.

An opening 163 is provided in each of the two opposite ends (in the vicinity of the magnetic pole ends 171, 172) of the accommodating hole 162. A magnetic path short circuit prevention opening 163 is defined in each of the two opposite ends of the permanent magnets 17A, 17B in a state in which the permanent magnets 17A, 17B are accommodated in the accommodating hole 162.

As shown in FIG. 1B, circumferential portions 19A, 19b are defined on the outer circumference of the rotor 15. The circumferential portions 19A, 19b each have radius R and extend about the rotational axis C with an angular width A. The associated radial lines 151A, 151B extends through the center of each circumferential portion 19A, 19B. The radial line 151A intersects the circumferential center 191 of the circumferential portion 19A, and the radial line 151B intersects the circumferential center 191 of the circumferential portion 19B. That is, the angular width between a radial line 152, which extends through a first edge 192 of each circumferential portion 19A, 19B, and the associated radial line 151A, 151B is equal to the angular width between a radial line 153, which extends through a second edge 193 of each circumferential portion 19A, 19B and the associated radial line 151A, 151B The circumferential surface extending between the first edge 192 and the second edge 193 about the rotational axis C is referred as a virtual circumferential surface E . . .

The center 191 of each circumferential portion 19A, 19B in the circumferential direction lies along the associated radial line 151A, 151B. The radial lines 151A, 151B are spaced at equal angles (60°) about the rotational axis C. That is, the circumferential portions 19A, 19B are arranged at an equal pitch in the circumferential direction, and the circumferential portions 19A, 19B correspond to the magnetic pole center 173 of the magnetic magnets 17A, 17B.

The angular width (angular width about the rotational axis C of the rotor 15) Θ of the pitch of the plurality of (18 pieces of) slots 122 arranged at an equal pitch in the circumferential direction of the stator 11 is 20°. The angular width A of the circumferential portions 19A, 19B is the same as the angular width Θ (=20°) of the pitch of the slots 122 arranged at an equal pitch in the circumferential direction of the stator 11.

The circumferential portion 19A corresponding to the permanent magnet 17A and the circumferential portion 19B corresponding to the permanent magnet 17B are spaced apart from each other. Each circumferential portion 19A is connected to the adjacent circumferential portion 19B by a convex portion 20 bulging outward in the radial direction of the rotor 15.

The convex portions 20 bridging over the edge 193 (or 192) of the circumferential portion 19A and the edge 192 (or 193) of the circumferential portion 19B are an arcuate circumferential surface having a radius that is larger than the radius R of the circumferential portions 19A, 19B. The convex portions 20 are of identical shape and size. Accordingly, the convex portions 20 project so as to be located inward than the circumferential surface E of the radius R including the circumferential portions 19A, 19B and radially outward of the rotor 15 within a range outward of a plane H connecting the edge 192 and the edge 193. In other words, the convex portions 20 project radially outward of the rotor 15 within a region between the circumferential surface E and the plane H (except for sections immediately above the circumferential surface E and on the plane H)). Moreover, a straight line J connecting two given points of the convex portions 20 (for instance, points 202, 203 shown in FIG. 1A) [shown in FIG. 1A] is located further inward than the convex portion 20.

In FIG. 1B, the arcuate circumferential surface and the plane H that comprise the convex portions 20 are each shown as an intersecting portion (that is, an intersecting curve) with a virtual plane (sheet of the drawing) that is orthogonal to the axis of the rotational axis C (hereinafter also referred to as "rotational axis C"). Hereinafter, the plane H may also be referred to as straight line H, and the arcuate circumferential surface comprising the convex portions 20 as convex arcuate curve H1.

The tip 201 of the convex portion 20 corresponds to a magnetic pole switching part 164 located between the first permanent magnet 17A and the second permanent magnet 17B. The gap G between the teeth 121 and the outer circumference of the rotor 15 becomes largest at a portion corresponding to the magnetic pole switching part 164, which is located between two adjacent permanent magnets 17A, 17B. Then, a space between the virtual circumferential surface E and the outer circumference of the rotor 15 becomes largest at a portion corresponding to the magnetic pole switching part 164. The distance between the outer circumference of the rotor 15 and the rotational axis C is thus minimal at the portion corresponding to the gap G.

Figure 5A:
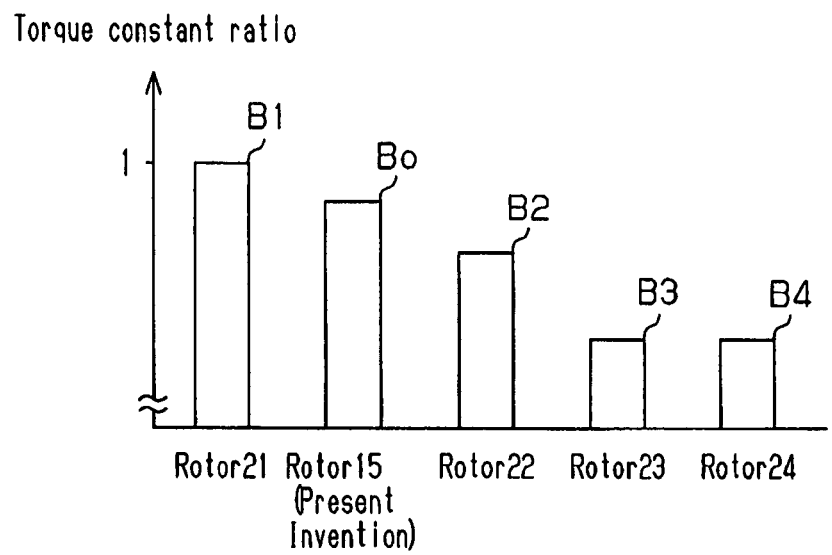
FIG. 5A is a graph showing a FEM (Finite Element Method) analysis example of the torque constant of the rotor 15 and the first to the fourth comparative rotors 21 to 24.
Figure 5B:
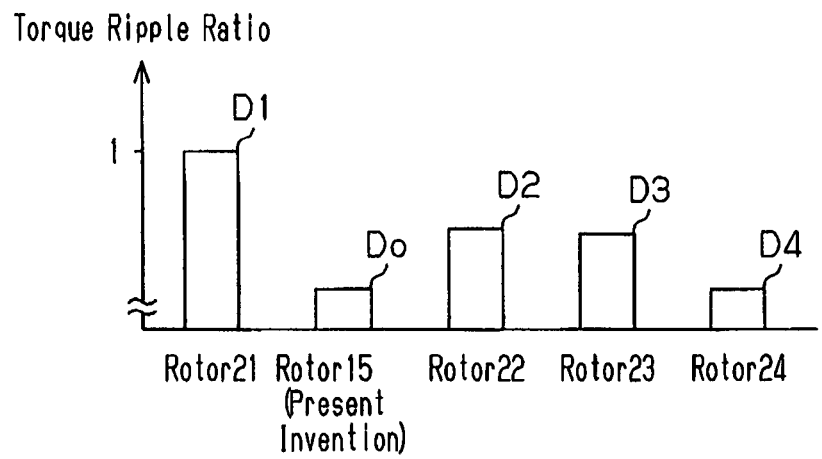
FIG. 5B is a graph showing the FEM analysis example of the torque ripple of the rotor 15 and the first to the fourth comparative rotors 21 to 24.

The bar graph of FIG. 5A shows an example in which the torque constant is obtained through FEM (Finite Element Method) analysis using the rotor 15 of the present embodiment and rotors 21, 22, 23 and 24 shown in FIGS. 12A, 12B, 12C and 12D, respectively. The torque constant is a value obtained by dividing an average value of output torque by an actual current value. The bar graph of FIG. 5B shows an example in which the torque ripple is obtained through FEM (Finite Element Method) analysis using the rotor 15 of the present embodiment and rotors 21, 22, 23 and 24, respectively. The torque ripple is a degree of the fluctuation width of the output torque. The stators 11 of each of the rotors 21, 22, 23 and 24 are of identical structure as that of the present embodiment. The arrangement and measure of the permanent magnets 17A, 17B of each of the rotors 21, 22, 23 and 24 are identical to those of the present embodiment.

Common conditions of analysis of these examples obtained through FEM (Finite Element Method) analysis are as follows: the width 17W of the permanent magnets 17A, 17B [shown in FIG. 9A] is smaller than the radius R of the circumferential portions 19A, 19B of the rotor core 16 (rotor 15), the air gap g [degree of interval between the circumferential portions 19A, 19B and the teeth 121 as shown in FIG. 9A]=0.5 mm, number of poles p=6, and number of slots=p×3 (=18).

The outer circumference of the rotor 21 in FIG. 12A is the circumferential surface E of the radius R. The outer circumference of the rotor 22 in FIG. 12B is comprised by the circumferential portions 19A, 19B of the radius R and the plane H connecting between adjacent circumferential portion 19A and circumferential portion 19B. The outer circumference of the rotor 23 in FIG. 12C is comprised by the circumferential portions 19A, 19B of the radius R and a concave portion 231 connecting between adjacent circumferential portion 19A and circumferential portion 19B. The concave portion 231 is an arcuate surface that concaves inward than the plane H. The outer circumference of the rotor 24 in FIG. 12D has a shape bridging over a sinusoidal circumferential surface (sinusoidal portion 241) in which the radius of the rotor 24 becomes minimum at a position of a magnetic pole switching part 164 between the adjacent permanent magnets 17A, 17B and maximum at a position of a magnetic pole center 173 between magnetic pole ends 171, 172. The length of radial lines 151A, 151B is R. The minimum radius of the rotor 24 is set to be larger than the minimum radius of the rotor 22 and to be smaller than the minimum radius of the rotor 15.

Bar B1 in the graph of FIG. 5A is represented with the torque constant of the rotor 21 in FIG. 12A being defined as 1. Bar Bo in the graph of FIG. 5A represents the torque constant of the rotor 15 of the present embodiment as a proportion to bar B1. Bar B2 in the graph of FIG. 5A represents the torque constant of the rotor 22 of FIG. 12B as a proportion to bar B1. Bar B3 in the graph of FIG. 5A represents the torque constant of the rotor 23 of FIG. 12C as a proportion to bar B1. Bar B4 in the graph of FIG. 5A represents the torque constant of the rotor 24 of FIG. 12D as a proportion to bar B1.

Bar D1 in the graph of FIG. 5B is represented with the torque ripple of the rotor 21 being defined as 1. Bar Do in the graph of FIG. 5B represents the torque ripple of the rotor 15 of the present embodiment as a proportion to bar D1. Bar D2 in the graph of FIG. 5B represents the torque ripple of the rotor 22 as a proportion to bar D1. Bar D3 in the graph of FIG. 5B represents the torque ripple of the rotor 23 as a proportion to bar D1. Bar D4 in the graph of FIG. 5B represents the torque ripple of the rotor 24 as a proportion to bar D1.

Figure 6:
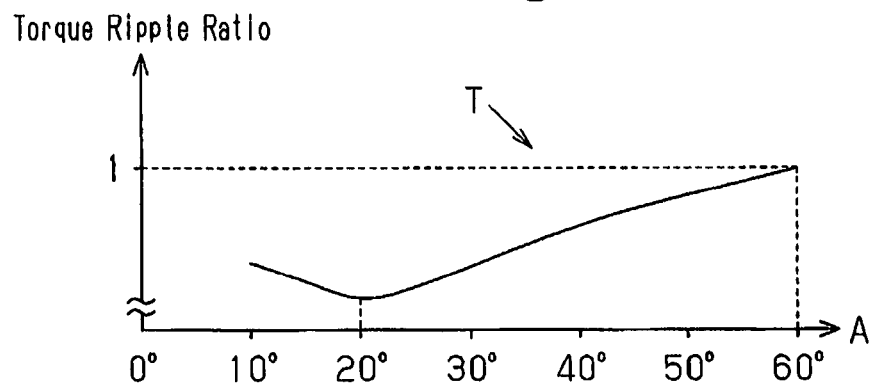
FIG. 6 is a graph showing a relationship between angular width A of circumferential portions 19A, 19B of the rotor 15 and the torque ripple.

Curve T in the graph of FIG. 6 shows a relationship between the angular width A of the circumferential portions 19A, 19B of the rotor 15 and the torque ripple. The curve T is obtained through FEM (Finite Element Method), and conditions of analysis as identical to those of FIG. 5A and FIG. 5B. The abscissa axis represents the angular width A about the rotational axis C of the rotor 15 and the ordinate axis a torque ripple ratio with the torque ripple of the rotor 21 of FIG. 12A (angular width A=60°) being defined as 1.

Figure 7:
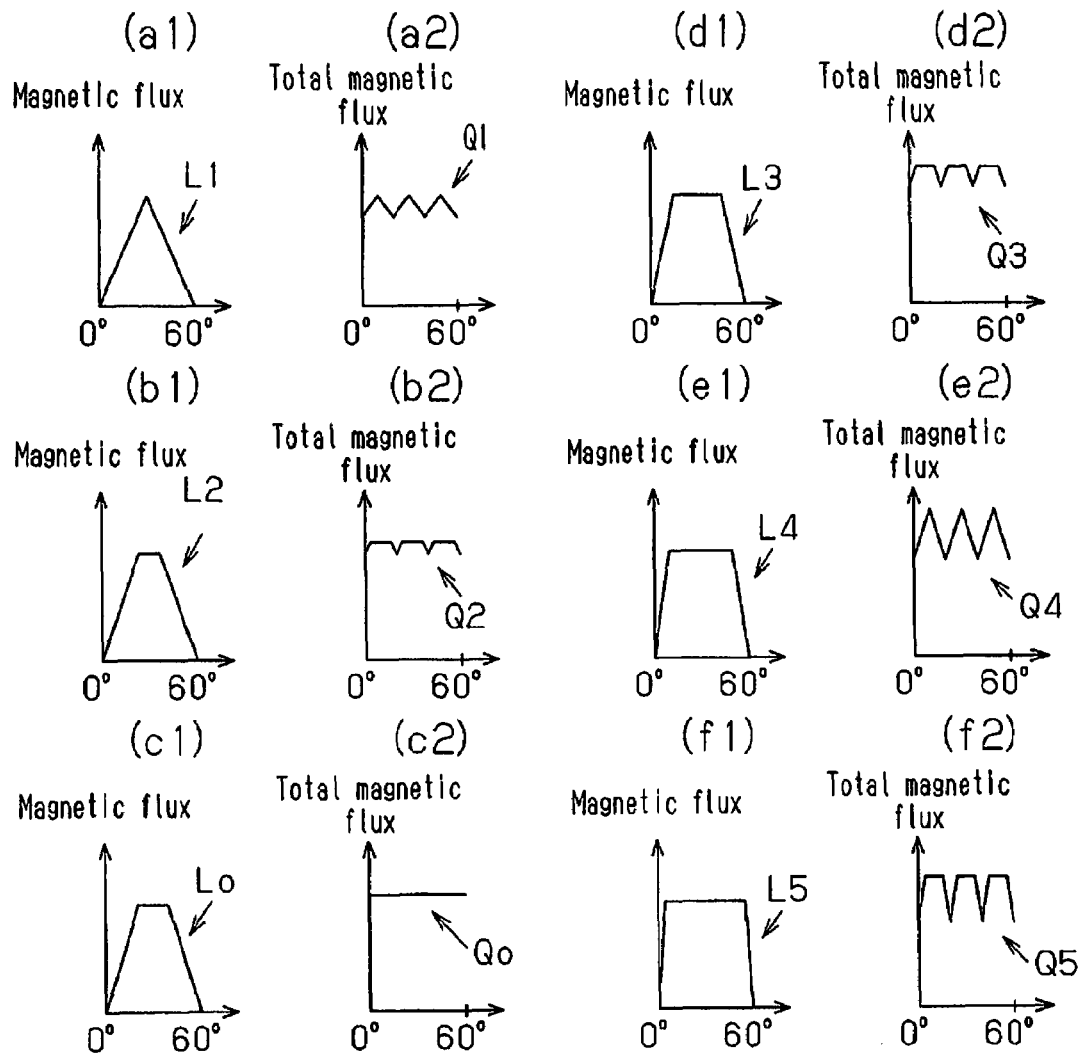
FIGS. 7(a1), 7(b1), 7(c1), 7(d1), 7(e1), and 7(f1) are graphs showing FEM (Finite Element Method) analysis examples of changes in magnetic flux of a single tooth when the angular range A is changed.

The curve L1 in the graph of FIG. 7(a1) shows changes in magnetic flux of a single tooth 121 when the angular width A of the circumferential portions 19A, 19B is 0°, and the curve L2 in the graph of FIG. 7(b1) shows changes in magnetic flux of a single tooth 121 when the angular width A of the circumferential portions 19A, 19B is 10°. The curve Lo in the graph of FIG. 7(c1) shows changes in magnetic flux of a single tooth 121 when the angular width A of the circumferential portions 19A, 19B is 20°. Curves L3, L4 and L5 in the graphs of FIGS. 7(d1), (e1) and (f1) shows changes in magnetic flux of a single tooth 121 when the angular width A of the circumferential portions 19A, 19B is 30°, 40° and 50°. The curves L1, L2, Lo, L3, L4 and L5 have been obtained through FEM (Finite Element Method) analysis, and conditions of analysis are identical to those of FIGS. 5A and 5B.

The curve Q1 in the graph of FIG. 7(a2) shows changes in the summation of magnetic fluxes of all the teeth 121 when the angular width A of the circumferential portions 19A, 19B is 0°, and the curve Q2 in the graph of FIG. 7(b1) shows changes in the summation of magnetic fluxes of all the teeth 121 when the angular width A of the circumferential portions 19A, 19B is 10°. The curve Qo in the graph of FIG. 7(c2) shows changes in the summation of magnetic fluxes of all the teeth 121 when the angular width A of the circumferential portions 19A, 19B is 20°. Curves Q3, Q4 and Q5 in the graphs of FIGS. 7(d2), (e2), and (f2) shows changes in the summation of magnetic fluxes of all the teeth 121 when the angular width A of the circumferential portions 19A, 19B is 30°, 40° and 50°. The curves Q1, Q2, Q3, Q4, Q5 and Qo have been obtained through FEM (Finite Element Method) analysis, and conditions of analysis are identical to those of FIGS. 5A and 5B.

Figure 8A:
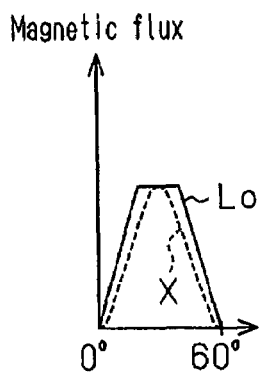
FIG. 8A is a graph showing a FEM (Finite Element Method) analysis example of changes in magnetic flux of a single tooth of the rotor 15 and rotor 24 when the angular range A is 20°.
Figure 8B:
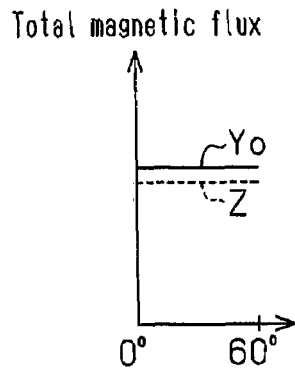
FIG. 8B is a graph showing a FEM (Finite Element Method) analysis example of changes in magnetic flux of a single tooth of the rotor 15 and rotor 24 when the angular range A is 20°.

The curve Lo in the graph of FIG. 8A shows changes in magnetic flux of a single tooth 121 when the angular width A of the circumferential portions 19A, 19B is 20°, and curve X shows changes in magnetic flux of a single tooth 121 when the outer circumferential surface of the rotor is formed by a sinusoidal curve [see FIG. 12D]. The curve Yo in the graph of FIG. 8B shows changes in the summation of magnetic fluxes of all the teeth 121 when the angular width A of the circumferential portions 19A, 19B is 20°, and line Z shows changes in magnetic flux of a single tooth 121 when the circumferential surface of the rotor is formed by a sinusoidal curve [see FIG. 12D]. Curves Lo, X and lines Yo, Z have been obtained through FEM (Finite Element Method) analysis, and conditions of analysis are identical to those of FIGS. 5A and 5B.

FIG. 9A shows a convex arcuate portion radial line 154 connecting the tip 201 (the middle of the convex portion 20 between the first edge 192 and the second edge 193 of the circumferential portions 19A, 19B) to a center of the convex portion 20 the rotational axis C. That is, the convex arcuate portion radial line 154 extends so as to bisect the convex portion 20 in the circumferential direction. The length of the convex portion radial line 154 is the minimum distance between the convex portion 20 and the rotational axis C. Hereinafter, the minimum distance (i.e., length of the convex portion radial line 154) between the convex portion 20 and the rotational axis C is referred to as the minimum radius Rmin. Dh denotes the difference between a middle position 190 of the virtual circumferential surface E and the tip 201. The middle position 190 bisects the virtual circumferential surface E between the first edge 192 and the second edge 193. Further, the tip 201 and the middle position 190 lie along an extension of the convex arcuate portion radial line 154. Dh represents the difference between the radius R of the circumferential portions 19A, 19B and the minimum radius Rmin. Dh is hereinafter referred to as depth Dh.

The radial line 155 in FIG. 9B is a radial line connecting a middle position Ho and a rotational axis C that equally divides the plane H into two in the circumferential direction, and overlaps convex arcuate radial line 154. The length of the radial line 155 is a minimum radius of the plane H (shortest length of the radial line from among the radial lines connecting the plane H and the rotational axis C). Hereinafter, the minimum radius of plane H is referred to as minimum radius Hr [shown in FIG. 9A]. Dmax represents a linear distance between the middle position Ho and middle position 190 and represents a difference between the radius R and the minimum radius Hr. Hereinafter, Dmax is referred to as virtual maximum difference Dmax. Virtual maximum difference Dmax=R×{1−cos ([(360°/p)−A]/2)} is true, wherein depth Dh is smaller than the virtual maximum difference Dmax.

The arc 20E in FIGS. 9A and 9B is a part of a circle that is concentric with the arcuate convex portions 20. A point 165 is a contact between a wall surface defining an opening 163 that comprises a part of an accommodating hole 162 accommodating the permanent magnet 17A and the arc 20E, and point 166 is a contact between a wall surface defining a opening 163 that comprises a part of accommodating hole 162 accommodating the permanent magnet 17B and the arc 20E. Line 156 represents a radial line related to a convex portion 20 that passes through the contact 165 and that connects the circular center of the convex portion 20 and the convex portion 20 (convex arcuate radial line connecting the circular center of the convex portion 20 and the convex portion 20). Line 157 represents a radial line related to a convex portion 20 that passes through the contact 166 and that connects the circular center of the convex portion 20 and the convex portion 20 (convex arcuate radial line connecting the circular center of the convex portion 20 and the convex portion 20). Bmin1 represents a linear distance between the contact 165 between the wall surface defining the opening 163 that comprises a part of the accommodating hole 162 in the permanent magnet 17A and the convex radial line 156 and an intersection 204 of the convex arcuate radial line 156 and the convex portion 20. Bmin2 represents a linear distance between the contact 166 between the wall surface defining the opening 163 that comprises a part of the accommodating hole 162 in the permanent magnet 17B and the convex radial line 157 and an intersection 205 of the convex arcuate radial line 157 and the convex portion 20. The linear distances Bmin1 and Bmin2 represent a shortest length of straight lines from among straight lines connecting the wall surface defining the accommodating hole 162 and the convex portion 20 and satisfy Bmin1=Bmin2. In other words, spacing Br1 between the contact 165 and the intersection 204 becomes a minimum interval between the wall surface defining the accommodating hole 162 and the convex portion 20, and spacing Br2 between the contact 166 and the intersection 205 becomes a minimum interval between the wall surface defining the accommodating hole 162 and the convex portion 20. Hereinafter, the spacing Br1 is referred to as a first minimum spacing Br1, and the spacing Br2 as a second minimum spacing Br2. Further, the contact 165 is referred to as a first initial point 165 of the first minimum spacing Br1 and the contact 166 is referred to as a second initial point 166 of the second minimum spacing Br2.

Θb represents the angular width between a radial line 158, which connects the rotational axis C and the first initial point 165, and a radial line 159, which connects the rotational axis C and the second initial point 166. That is, Θb represents the angular width between the first initial point 165 and the second initial point 166 about the rotational axis C. The first initial point 165 is located on one of the adjacent accommodating holes 162 that is separated by the first minimum spacing Br1 from the convex portion 20. The second initial point 166 is located on the other one of the accommodating holes 162 that is separated by the second minimum spacing Br2 from the convex portion 20. Here, Θb is referred to as inter-bridge angle Θb.

In the illustrated case, the initial points 165, 166 are determined to be one each.

In this respect, where the first initial point 165 that provides the first minimum spacing Br1 exists in plurality, the first initial point 165 closest to the magnetic pole center 173 of the permanent magnet 17A is employed, and where the second initial point 166 that provides the second minimum spacing Br2 exists in plurality, the second initial point 166 closest to the magnetic pole center 173 of the permanent magnet 17B is employed. In other words, where initial points 165, 166 that provide minimum spacings Br1, Br2 are provided by a plurality of numbers, the largest angular width from among the angular widths between the initial points 165, 166 about the rotating axis C is employed as inter-bridge angle Θb. Further, when the wall surface defining the opening 163 that comprises a part of the accommodating hole 162 and the arc 20E are in linear contact in the circumferential direction of the arc 20E, an infinite number of initial points 165, 166 will be present, but the first initial point 165 closest to the magnetic pole center 173 of the permanent magnet 17A and the second initial point 166 closest to the magnetic pole center 173 of the permanent magnet 17B will be employed also in such instance.

Figure 11A:
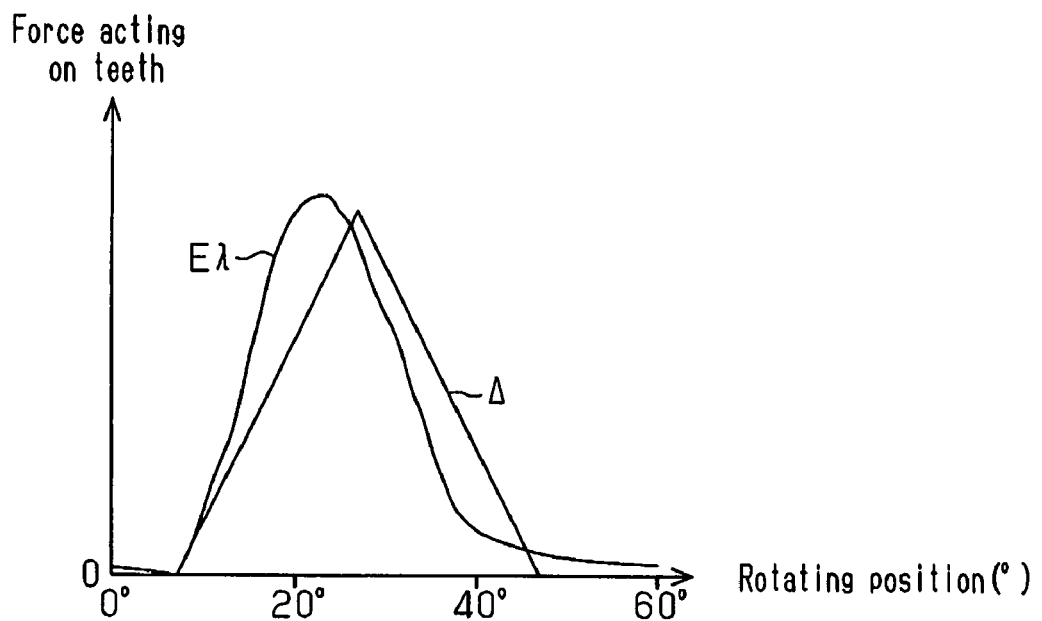
FIG. 11A is a graph showing the force acting on the teeth.
Figure 11B:
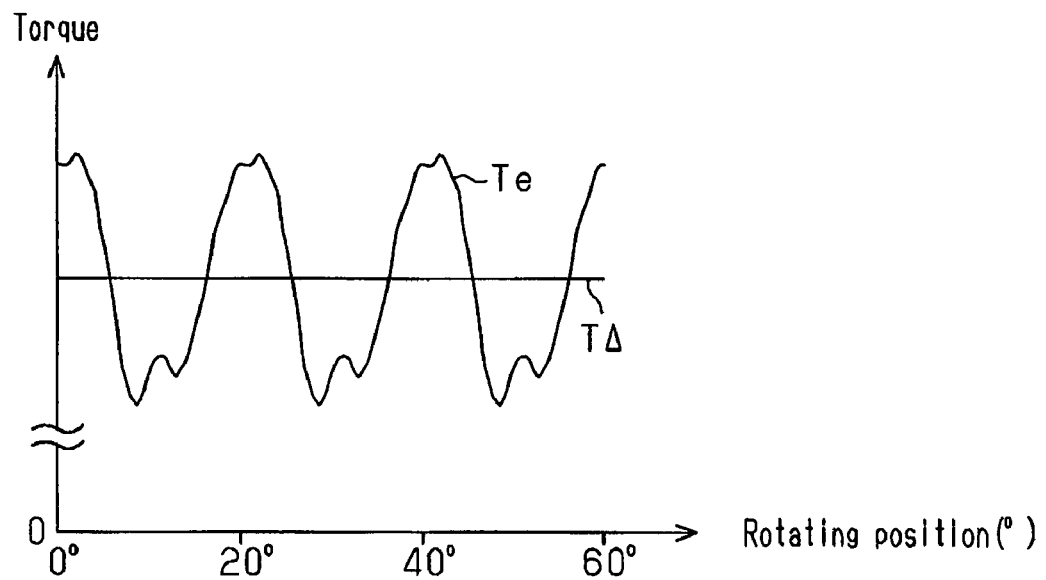
FIG. 11B is a graph showing the torque fluctuation.

The graph of FIG. 11A shows the relationship between the rotation position of the rotor and the force acting on any one of the teeth 121. The waveform Δ shows an ideal example. The waveform Δ and the horizontal axis form an isosceles triangle. The base of which isosceles triangle shows that the angular spacing between the starting end and the terminating end on the horizontal axis is 40°. A horizontal line TΔ shown in the graph of FIG. 11B is obtained by synthesizing such waveform Δ relating to all the teeth 121. That is, if the waveform of the force acting on one tooth 121 is waveform Δ, the output torque becomes constant (TΔ), and the torque ripple becomes zero.

The waveform Eλ in the graph of FIG. 11A shows the relationship between the rotation position of the first comparative rotor 21 of FIG. 12A and the force acting on any one of the teeth 121 of the first comparative rotor 21. The synthesized waveform Te shown in the graph of FIG. 11B is obtained by synthesizing such waveform Eλ related to all the teeth 121 of the first comparative rotor 21. That is, if the force acting on one tooth 121 is the force shown by the waveform Eλ, the output torque in which the torque ripple is not zero is obtained. That is, the torque ripple of the rotating electric machine becomes smaller as the shape of the waveform Eλ becomes closer to the shape of the waveform Δ.

With regard to the rotor 21 shown in FIG. 12A, the torque ripple rate Ri is calculated from the result of the FEM analysis conducted under the above common analysis conditions and a condition of inter-bridge angle Θb=5.2°. The torque ripple rate Ri is a value obtained by dividing the torque ripple (size of fluctuation width of the output torque) by an average value of the output torque. The torque ripple rate R1 of the rotor 15 is smaller than the torque ripple rate resulting from the FEM analysis under the above common analysis conditions and the condition of the inter-bridge angle Θb=10° for the first comparative rotor 21 of FIG. 12A. A ratio Rx/Ri of a certain torque ripple rate Rx with respect to the torque ripple rate Ri of the FEM analysis result under the above common analysis conditions and the condition of the inter-bridge angle being Θb=5.2°, using the first comparative rotor 21 of FIG. 12A is hereinafter referred to as a torque ripple rate ratio. The torque ripple rate ratio Rx/Ri is directly proportional to the torque ripple rate Rx.

The inter-bridge angles Θb=10°, 5.2° represent maximum angular widths from among angular widths that are formed by minimum spacings between one of a pair of adjacent accommodating holes 162 and the circumferential surface E of the radius R and minimum spacings between the other one of the pair of adjacent accommodating holes 162 and the circumferential surface E of the radius R about a rotating axis of the rotor 21.

Figure 10A:
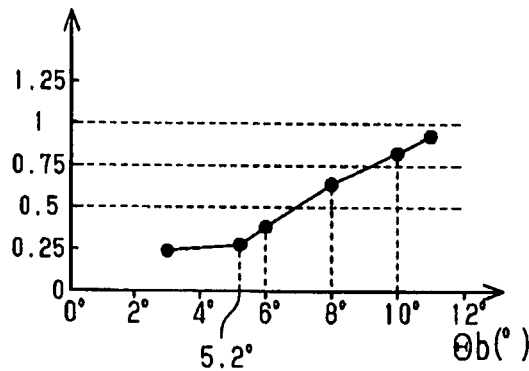
FIG. 10A is a graph showing an appropriate range of the inter-bridge angle Θb.

The graph of FIG. 10A shows an example in which changes in the torque ripple rate ratio Rx/Ri in which inter-bridge angles Θb are varied using rotor 15 are obtained through FEM (Finite Element Method) analysis. The abscissa axis represents values of the inter-bridge angle Θb while the ordinate axis represents values of the torque ripple rate ratio Rx/Ri. The black dots in the graph represent actual data obtained through FEM analysis.

Figure 10D:
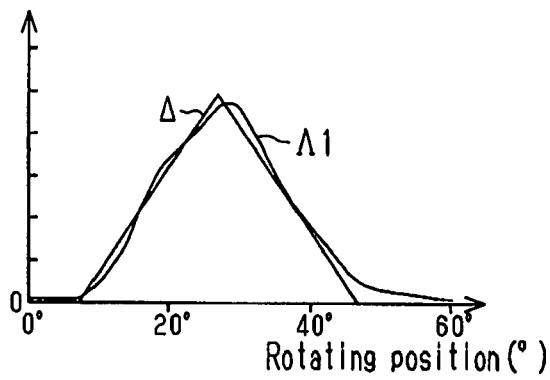
FIGS. 10D, 10E and 10F are graphs showing force acting on the teeth.
Figure 10B:
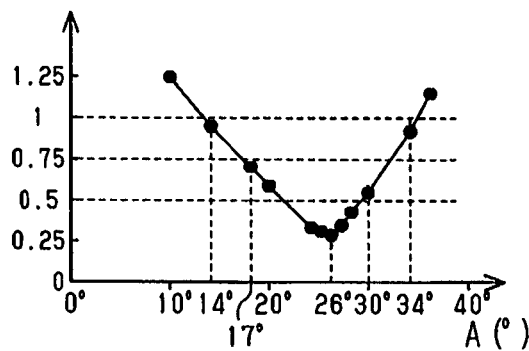
FIG. 10B is a graph showing an appropriate range of the angular width A.

The graph of FIG. 10B shows examples in which changes in the torque ripple rate ratio Rx/Ri in which angular widths A are varied using rotor 15 are obtained through FEM (Finite Element Method) analysis. The abscissa axis represents values of the angular width A while the ordinate axis represents values of the torque ripple rate ratio Rx/Ri. The black dots in the graph represent actual data obtained through FEM analysis.

Figure 10E:
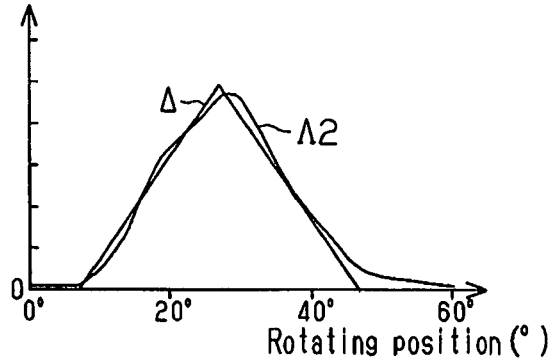
Figure 10C:
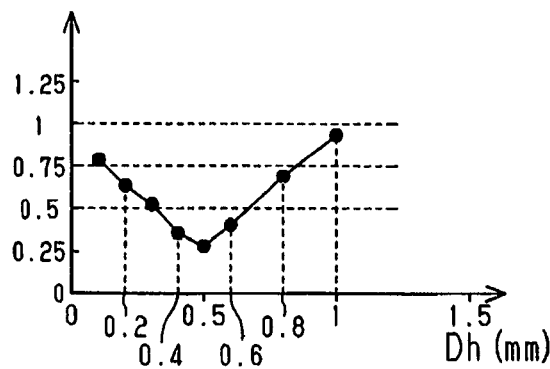
FIG. 10C is a graph showing an appropriate range of the depth Dh.

The graph of FIG. 10C shows an example in which changes in the torque ripple rate ratio Rx/Ri in which depths Dh are varied using rotor 15 are obtained through FEM (Finite Element Method) analysis. The abscissa axis represents values of depth Dh while the ordinate axis represent values of the torque ripple rate ratio Rx/Ri. The black dots in the graph represent actual data obtained through FEM analysis.

Common conditions of analysis in these examples obtained through FEM (Finite Element Method) analysis are: the width 17W of the permanent magnets 17A, 17B [shown in FIG. 9A] is smaller than the radius R of the circumferential portions 19A, 19B of the rotor core 16 [rotor 15]; and the air gap g [degree of the interval between the circumferential portions 19A, 19B and the teeth 121 shown in FIG. 9A]=0.5 mm, number of poles p=6, and number of slots 122=p×3 (=18).

Conditions of analysis other than the above common conditions of analysis in the FEM analysis of FIG. 10A are angular width A=26° and depth Dh=0.5 mm. According to the FEM analysis example of FIG. 10A, when the inter-bridge angle Θb is set to be in the range of 0°<Θb≦10°, the torque ripple rate ratio Rx/Ri can be suppressed to be less than 1. When the inter-bridge angle Θb is set to be in the range of 0°<Θb≦8°, the torque ripple rate ratio Rx/Ri can be suppressed to be less than 0.75. When the inter-bridge angle Θb is set to be in the range of 0°<Θb≦6°, the torque ripple rate ratio Rx/Ri can be suppressed to be less than 0.5. Particularly an inter-bridge angle Θb of 5.2° is optimal in sufficiently exploiting effects of reducing the torque ripple rate and securing strength between magnetic poles.

Conditions of analysis other than the above common conditions of analysis in the FEM analysis of FIG. 10B are depth Dh=0.5 mm and inter-bridge Θb=5.2°. According to the FEM analysis example of FIG. 10B, when the angular width A is set to be in the range of 14°≦A≦34°, the torque ripple rate ratio Rx/Ri can be suppressed to be less than 1.

When the angular width A is set to be in the range of 17°≦A≦30°, the torque ripple rate ratio Rx/Ri can be suppressed to be less than 0.75. When the angular width A is set to be in the range of 24°≦A≦28°, the torque ripple rate ratio Rx/Ri can be suppressed to be less than 0.5. Particularly A=26° is optimal in sufficiently exploiting effects of reducing the torque ripple rate.

Conditions of analysis other than the above common conditions of analysis in the FEM analysis of FIG. 10C are angular width A=26° and inter-bridge Θb=5.2°. According to the FEM analysis example of FIG. 10C, when the depth Dh is set to be in the range of 0<Dh≦1 mm, the torque ripple rate ratio Rx/Ri can be suppressed to be less than 1.

When the depth Dh is set to be in the range of 0.2 mm≦Dh≦0.8 mm, the torque ripple rate ratio Rx/Ri can be suppressed to be less than 0.75.

When the depth Dh is set to be in the range of 0.4 mm≦Dh≦0.6 mm, the torque ripple rate ratio Rx/Ri can be suppressed to be less than 0.5. Particularly Dh=0.5 mm is optimal in sufficiently exploiting effects of reducing the torque ripple rate.

Figure 10F:
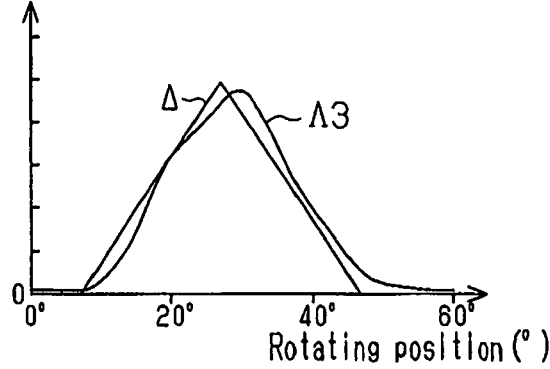

The waveform Λ1 in the graph of FIG. 10D shows a relationship between rotating positions of the rotor 15 and force acting on one single tooth 121 when the inter-bridge angle is defined to be Θb=5.2° in the FEM analysis example of FIG. 10A. The waveform Λ2 in the graph of FIG. 10E shows a relationship between rotating positions of the rotor 15 and force acting on one single tooth 121 where the angular width is defined to be A=26° in the FEM analysis example of FIG. 10B. The waveform Λ3 in the graph of FIG. 10F shows a relationship between rotating positions of the rotor 15 and force acting on one single tooth 121 where the depth is defined to be Dh=0.5 mm in the FEM analysis example of FIG. 10C. The torque ripple rate of the synthesized waveform of waveform Λ1 related to all the teeth 121 is quite small. Similarly, the torque ripple rate of the synthesized waveform of waveform Λ2 related to all the teeth 121 is quite small, and the torque ripple rate of the synthesized waveform of waveform Λ3 related to all the teeth 121 is quite small.

The FEM analysis example of FIG. 10A has been performed under the condition for the angular width being A=26° and that for the depth being Dh=0.5 mm, wherein changes in the value of the angular width A or the depth Dh result in changes in the torque ripple rate ratio Rx/Ri. In other words, when the value for the angular width is changed from 26° to another value, the torque ripple rate ratio Rx/Ri tends to increase, and when the value for the depth Dh is changed from 0.5 mm to another value, the torque ripple rate ratio Rx/Ri tends to increase. However, when the value of the angular width A or the value of the depth Dh is suitably changed, the torque ripple rate ratio Rx/Ri can be set to less than 1 for inter-bridge angles Θb set in the range of 0°<Θb<10°. Similarly, when the value of the angular width A or the value of the depth Dh is suitably changed, the torque ripple rate ratio Rx/Ri can be set to less than 0.75 for inter-bridge angles Θb set in the range of 0°<Θb<8°. Similarly, when the value of the angular width A or the value of the depth Dh is suitably changed, the torque ripple rate ratio Rx/Ri can be set to less than 0.5 for inter-bridge angles Θb set in the range of 0°<Θb<6°.

The FEM analysis example of FIG. 10B has been performed under the condition for the inter-bridge angles being Θb=5.2° and that for the depth being Dh=0.5 mm, wherein changes in the value of the inter-bridge angle Θb or the depth Dh result in changes in the torque ripple rate ratio Rx/Ri. In other words, when the value for the inter-bridge angle Θb is changed from 5.2° to a larger value, the torque ripple rate ratio Rx/Ri tends to increase, and when the value for the depth Dh is changed from 0.5 mm to another value, the torque ripple rate ratio Rx/Ri tends to increase. However, when the value of the inter-bridge angle Θb or the value of the depth Dh is suitably changed, the torque ripple rate ratio Rx/Ri can be set to less than 1 for angular widths set in the range of 14°<A<34°. Similarly, when the value of the inter-bridge angle Θb or the value of the depth Dh is suitably changed, the torque ripple rate ratio Rx/Ri can be set to less than 0.75 for angular widths set in the range of 17°<A<30°. Similarly, when the value of the inter-bridge angle Θb or the value of the depth Dh is suitably changed, the torque ripple rate ratio Rx/Ri can be set to less than 0.5 for angular widths set in the range of 24°<A<28°.

The FEM analysis example of FIG. 10C has been performed under the condition for the inter-bridge angles being Θb=5.2° and that for the angular width being A=26°, wherein changes in the value of the inter-bridge angle Θb or the angular width A result in changes in the torque ripple rate ratio Rx/Ri. In other words, when the value for the inter-bridge angle Θb is increased from 5.2°, the torque ripple rate ratio Rx/Ri tends to increase, and when the value for the angular width A is changed from 26° to another value, the torque ripple rate ratio Rx/Ri tends to increase. However, when the value of the inter-bridge angle Θb or the value of the angular width A is suitably changed, the torque ripple rate ratio Rx/Ri can be set to less than 1 for depths Dh set in the range of 0<Dh<1 mm. Similarly, when the value of the inter-bridge angle Θb or the value of the angular width A is suitably changed, the torque ripple rate ratio Rx/Ri can be set to less than 0.75 for depths Dh set in the range of 0.2 mm<Dh<0.8 mm. Similarly, when the value of the inter-bridge angle Θb or the value of the angular width A is suitably changed, the torque ripple rate ratio Rx/Ri can be set to less than 0.5 for depths Dh set in the range of 0.4 mm<Dh<0.6 mm.

The angles of the angular widths A and depths Dh represented by the above-indicated equalities and inequalities correspond to cases in which R=25.5 mm and number of poles p=6 are true. However, when the radius R is not 25.5 mm or the number of poles p is not 6, Dh should be substituted by Dhr that is represented by Dhr=Dh×25.5/R, and A should be substituted by A×p/6.

Ranges of the angular widths A and the depth Dh with which the torque ripple rate ratio Rx/Ri becomes less than 1 will now be explained with reference to FIG. 13.

Figure 13A:
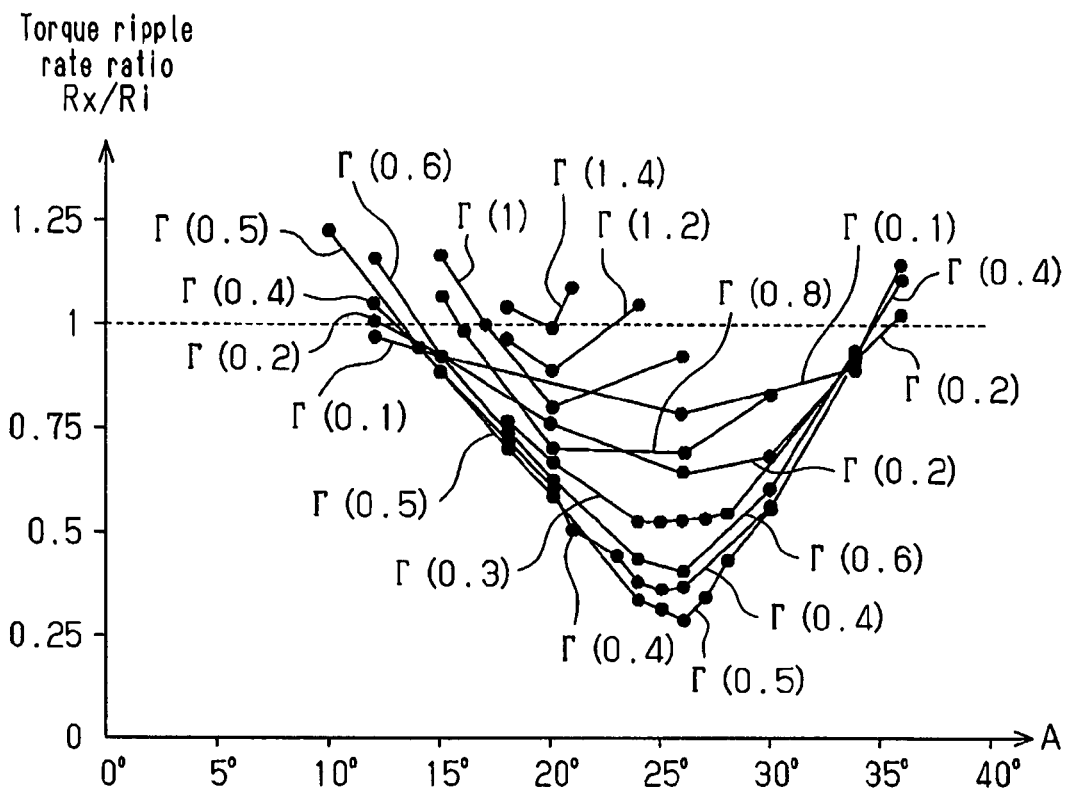
FIG. 13A is a graph showing the FEM analysis example of change in the torque ripple rate ratio Rx/Ri when the angular width A of the rotor 15 is changed.

The graph of FIG. 13A shows examples in which changes in the torque ripple rate ratio Rx/Ri in which angular widths A are varied using rotor 15 are obtained through FEM (Finite Element Method) analysis. The abscissa axis represents values of the angular widths A while the ordinate axis represents values of the torque ripple rate ratio Rx/Ri. The black dots in the graph represent actual data obtained through FEM analysis.

The group of actual data Γ(0.1), Γ(0.2), Γ(0.3), Γ(0.4), Γ(0.5), Γ(0.6), Γ(0.8), Γ(1), Γ(1.2) and Γ(1.4) in the graph of FIG. 13A indicates data obtained under conditions for the depth Dh being 0.1, 0.2, 0.3, 0.4, 0.5, 0.6, 0.8, 1, 1.2, 1.4 (in units of mm) in this order, the above common conditions of analysis, and the condition for the inter-bridge angle Θb being 5.2°.

Figure 13B:
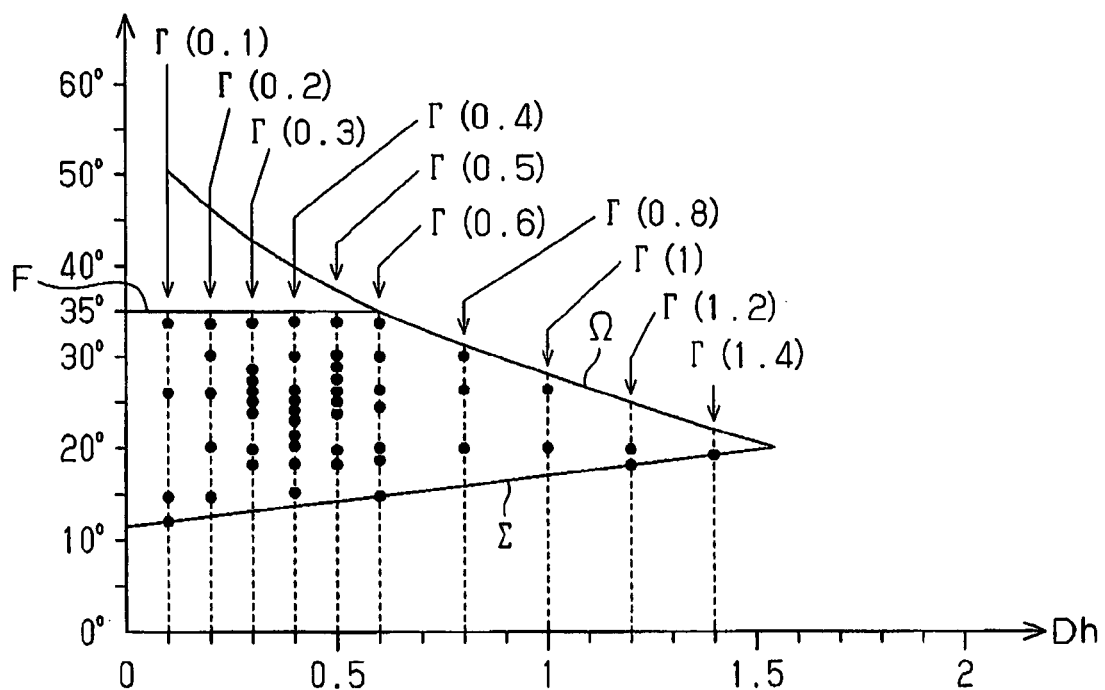
FIG. 13B is a graph showing determination of an appropriate range of combination of the angular width A and depth Dh for obtaining a torque ripple rate ratio Rx/Ri of less than 1.

The graph of FIG. 13B is an explanatory view prepared for determining suitable ranges of combination of the angular widths A and the depth Dh on the basis of the graph of FIG. 13B. The ordinate axis of FIG. 13B represents angular width A while the abscissa axis represents depth Dh. The group of black dots shown in FIG. 13B represents actual data from among the group of actual data Γ(0.1), Γ(0.2), Γ(0.3), Γ(0.4), Γ(0.5), Γ(0.6), Γ(0.8), Γ(1), Γ(1.2) and Γ(1.4) with which the torque ripple rate ratio Rx/Ri becomes less than 1.

The curve Ω represents upper limits for the angular widths A and depths Dh, wherein while the convex portions 20 can be formed through the angular widths A downward of the curve Ω and the depths Dh leftward of the curve Ω but the convex portions 20 cannot be formed through the angular widths A upward of the curve Ω and the depths Dh rightward of the curve Ω. Straight lines F, Σ are straight lines set for limiting the torque ripple rate ratio Rx/Ri to less than 1. The region enclosed by the curve Ω, the straight lines F, Σ and the ordinate axis is a region in which the torque ripple rate ratio Rx/Ri becomes less than 1.

The curve Ω is given by the following equation (2).

$$A = [360/p - 2 \times arccos(1 - Dh/R)]° \quad (2)$$

p is a number of poles, arccos (1−Dh/R) is an angle σ at cos σ that provides the value (1−Dh/R).

Straight line F is given by the following equation (3).

$$A = 35° \times 6/p \quad (3)$$

Straight-line Σ is given by the following equation (4).

$$A = (5.8 \times Dh + 11.3)° \times 6/p \quad (4)$$

Gathering from the above equations (2) to (4), the torque ripple rate ratio Rx/Ri can be set to less than 1 when the angular widths A and depths Dh are set in the range given by the following equation (1-0).

$$(5.6 \times Dh + 11.3)° \times 6/p \leq A < 35° \times 6/p$$

and $$A < [360/p - 2 \times arccos(1 - Dh/R)]° \quad (1\text{-}0)$$

While equation (1-0) corresponds to a case in which R=25.5 mm is true, this equation (1-0) can be expanded to the following equation (1) by defining Dhr=Dh×25.5/R also when the radius R is not 25.5 mm.

$$(5.6 \times Dh + 11.3)° \times 6/p \leq A < 35° \times 6/p$$

and $$A < [360/p - 2 \times arccos(1 - Dh/R)]° \quad (1)$$

The first embodiment has the advantages described below.

(1-1) As apparent from the graph of FIG. 5A, the torque constant for the rotor 15 is not much different from the torque constant for the first comparative rotor 21 in which the outer circumference has a constant radius (=R). The torque constant for the rotor 15 is greater than the torque constant for each of the second to the fourth comparative rotors 22 to 24. That is, the lowering of torque for each of the second to the fourth comparative rotors 22 to 24 is greater than for the rotor 15, in particular, the lowering of torque for the third and the fourth comparative rotors 23, 24 is prominent.

As apparent from the graph of FIG. 5B, the torque ripple for the rotor 15 is greatly lowered compared to the torque ripple for the first comparative rotor 21 in which the outer circumference has a constant radius (=R). The torque ripple for each of the second to the fourth comparative rotor 22 to 24 is also small compared to the torque ripple for the first comparative rotor 21, but the torque ripple for the rotor 15 is small compared to the torque ripple for the second and the third comparative rotors 22, 23. The torque ripple for the fourth comparative rotor 24 has about the same size as the torque ripple for the rotor 15, but the torque for the fourth comparative rotor 24 is greatly lowered compared to the rotor 15, as apparent from the graph of FIG. 5A.

According to the graph of FIG. 8A, the magnetic flux changes are small for both of the rotor 15 of the present embodiment and the rotor 24 of FIG. 12D. However, according to the graph of FIG. 8B, the total magnetic flux of the rotor 15 according to the present embodiment is larger than that of the rotor 24 of FIG. 12D, and the FEM analysis result of FIG. 8B indicates that the rotor 15 of the present embodiment is more advantaged than the rotor 24 of FIG. 12D.

As apparent from the FEM analysis result shown in FIG. 5A and FIG. 5B, the rotor 15 excels in suppressing the size of the torque and the torque fluctuation than the other first to the fourth comparative rotors 21 to 24. The configuration of having a minimum gap between the teeth 121 of the stator 11 and the outer circumference of the rotor 15 across the entire circumferential portions 19A, 19B contributes to avoiding the lowering of the torque. The convex portion 20 that smoothes the magnetic flux fluctuation at the outer circumferential surface of the rotor 15 contributes to suppressing the torque fluctuation and also contributes to avoiding the lowering of the torque. That is, the result that the rotor 15 excels in suppressing the size of the torque and the torque fluctuation than the other first to the fourth comparative rotors 21 to 24 is provided by the configuration of connecting the adjacent circumferential portions 19A, 19B, which are spaced apart, with the convex portion 20.

(1-2) The convex portions 20 are formed by a convex arcuate curve H1 having a radius larger than the radius R of the circumferential portions 19A, 19B. As it is apparent from the FEM analysis result of FIG. 5B, the convex arcuate curve H1 (arcuate circumferential surface) that smoothes the magnetic flux fluctuation on the outer circumferential surface of the rotor 15 is suitable for suppressing torque pulsation.

Further, when the convex arcuate curves H1, of which the radius is larger than the radius R of the circumferential portions 19A, 19B is jointed to the edge 192 of the circumferential portion 19A and the edge 193 of the circumferential portion 19B, the convex arcuate curve H1 becomes convex towards outside in the radial direction within a region between the circumferential surface E and the plane H (except for sections immediately above the circumferential surface E and on the plane H). Accordingly, the convex arcuate curves H1 (arcuate circumferential surface) are a suitable curve (curved surface) in forming the outer circumferential surface of the rotor 15 that is convex towards outside in the radial direction within the region between the circumferential surface E and the plane H (except for sections immediately above the circumferential surface E and on the plane H).

(1-3) As it is apparent from the FEM analysis result of FIG. 6, the torque ripple is minimum when the angular width A of the circumferential portions 19A, 19B is 20°. The graphs of FIGS. 7(*a*2), (*b*2), (*c*2), (*d*2), (*e*2), and (*f*2) indicate that the total magnetic flux variation becomes smallest when the angular width A of the circumferential portions 19A, 19B and the angular width $\Theta(=20°)$ of the pitch of the slot 122 around the rotational axis C of the rotor 15 are made equal to each other.

In other words, an arrangement in which the angular width A of the circumferential portions 19A, 19B and the angular width $\Theta(=20°)$ of the pitch of the slot 122 around the rotational axis C of the rotor 15 are made equal to each other is particularly suitable for reducing the torque ripple.

(1-4) The analysis results of FIGS. 5A, 5B, and 6 is obtained on the assumption that the circumferential portions 19A, 19B are arranged at equal pitch in the circumferential direction. The configuration in which a plurality of circumferential portions 19A, 19B are arranged at equal pitch is suitable for preventing the lowering of the torque and for suppressing the torque fluctuation.

(1-5) The maximum gap between the teeth 121 and the outer circumference of the rotor 15 is a gap G corresponding to the magnetic pole switching part 164 located between two adjacent permanent magnets 17A, 17B. The structure having the gap G corresponding to the magnetic pole switching part 164 being the largest contributes to alleviating sudden fluctuation in the magnetic flux density and suppressing torque fluctuation.

(1-6) The structure using wave winding of three phases for the winding method of the stator 11 is advantageous in suppressing vibration.

(1-7) In a permanent magnet embedment rotating electric machine comprising arcuate circumferential surface shaped convex portions 20 formed by the convex arcuate curve H1 and a stator 11 having a rotor 15 arranged as p=6 and 18 slots 122, an arrangement in which the inter-bridge angle $\Theta$b is set to be in the range of $0°<\Theta b \leq 10°$ is effective and preferable in suppressing the torque ripple rate. An arrangement in which the inter-bridge angle $\Theta$b is set to be in the range of $0°<\Theta b \leq 8°$ is more effective in suppressing the torque ripple rate ratio Rx/Ri, that is the torque ripple rate. An arrangement in which the inter-bridge angle $\Theta$b is set to be in the range of $0°<\Theta b \leq 60$ is more effective in suppressing the torque ripple rate. An inter-bridge angle $\Theta$b of 5.2° is particularly preferable. An arrangement in which the angular width A is set to 26° and the depth Dh to 0.5 mm is even more preferable in sufficiently exploiting effects of reducing the torque ripple rate.

(1-8) In a permanent magnet embedment rotating electric machine comprising arcuate circumferential surface shaped convex portions 20 formed by the convex arcuate curve H1 and a stator 11 having a rotor 15 arranged as p=6 and 18 slots 122, an arrangement in which the depth Dh is set to be in the range of $0<Dh \leq 1$ mm is effective in suppressing the torque ripple rate ratio Rx/Ri, that is, the torque ripple rate. An arrangement in which the depth Dh is set to be in the range of $0.2$ mm $\leq Dh \leq 0.8$ mm is more effective in suppressing the torque ripple rate. An arrangement in which the depth Dh is set to be in the range of $0.4$ mm $\leq Dh \leq 0.6$ mm is more effective in suppressing the torque ripple rate. A depth Dh of 0.5 mm is particularly preferable. An arrangement in which the angular width A is set to 26° and the inter-bridge angle $\Theta$b of 5.2° is even more preferable in sufficiently exploiting effects of reducing the torque ripple rate.

An arrangement in which the inter-bridge angle $\Theta$b is set to 5.2° and the angular width A is set to 26° is preferable in suppressing the torque ripple rate ratio Rx/Ri, that is the torque ripple rate.

(1-9) In a permanent magnet embedment rotating electric machine comprising arcuate circumferential surface shaped convex portions 20 formed by the convex arcuate curve H1 and a stator 11 having a rotor 15 arranged as p=6 and 18 slots 122, an arrangement in which the angular width A is set to be in the range of $14° \leq A \leq 34°$ is effective in suppressing the torque ripple rate ratio Rx/Ri, that is the torque ripple rate. An arrangement in which the angular width A is set to be in the range of $17° \leq A \leq 30°$ is more effective in suppressing the torque ripple rate. An arrangement in which the angular width A is set to be in the range of $24° \leq A \leq 28°$ is more effective in suppressing the torque ripple rate. An angular width A of 26° is particularly preferable.

(1-10) An arrangement in which the angular width A is set to 26°, the depth Dh to 0.5 mm and the inter-bridge angle $\Theta$b of 5.2° is particularly preferable in sufficiently exploiting effects of reducing the torque ripple rate and securing strength between magnetic poles.

(1-11) In the afore-mentioned sections (1-8), (1-9) and (1-10), the same advantages can be achieved even when Dh is substituted by Dhr and A by A×p/6.

(1-12) In an arrangement in which the angular widths A and the depths Dh are set in the range given by equation (1), values obtained by dividing torque ripples by an average of output torques (torque ripple rate) will be smaller when compared to cases of rotating electric machines employing rotor 21 having a constant outer circumferential radius.

It should be apparent to those skilled in the art that the present invention may be embodied in many other specific forms without departing from the spirit or scope of the invention. Particularly, it should be understood that the present invention may be embodied in the following forms.

(1) The total number of permanent magnets 17A, 17B may be in pluralities other than six.

(2) The present invention may be applied to rotating electric machines with four poles and twelve slots, six poles and twenty-seven slots, eight poles and twenty-four slots, and so on. This would have the same advantages as the above embodiments.

(3) The present invention may be applied to a rotating electric machine including a rotor 15 having two permanent magnets 17A, 17B in a V-shaped manner and having the two permanent magnets 17A, 17B embedded therein so that the polarity of the adjacent permanent magnets 17A, 17B is N-N-S-S-N-N-S-S-....

Figure 14:
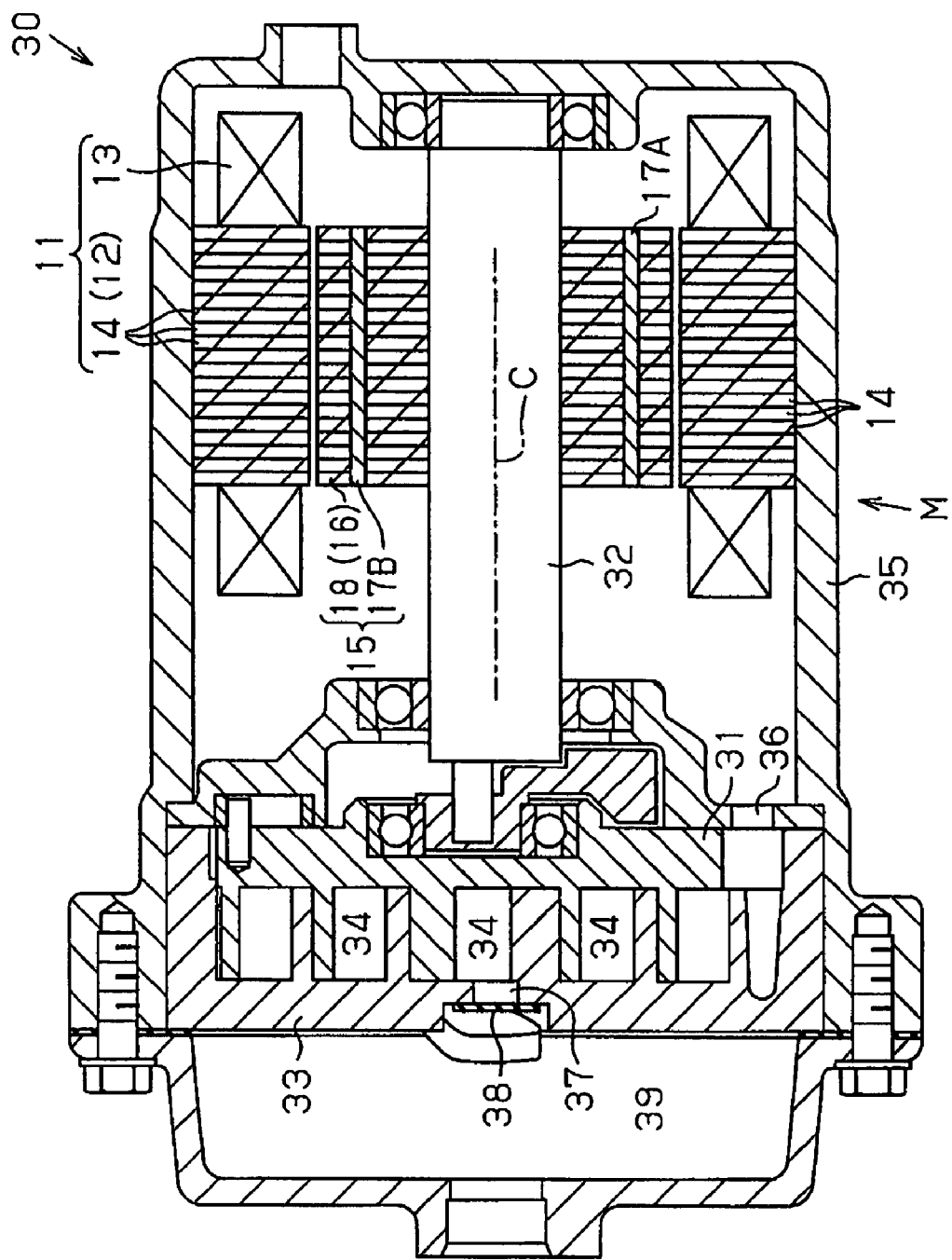
FIG. 14 is side cross-sectional view of an entire compressor to which the present invention is applied.

(4) As shown in FIG. 14, the present invention may be applied to an enclosed electric compressor 30. The electric compressor 30 is a scroll type electric compressor. The rotor 15 of the rotating electric machine M is attached to the rotating shaft 32, and the stator 11 of the rotating electric machine M is fixed to the inner surface of the motor housing 35. The rotating shaft 32 of the rotating electric machine M rotates a movable scroll 31 of the electric compressor 30 (compression operation). This rotation reduces the volume of a compression chamber 34, which is defined between a fixed scroll 33 and the movable scroll 31 that serves as a compression operation body. Coolant is drawn into the motor housing 35 from an external coolant circuit (not shown) and sent through a suction port 36 into the compression chamber 34. The coolant in the compression chamber 34 is then forced out of a discharge valve 38 from a discharge port 37 and discharged into a discharge chamber 39. The coolant in the discharge chamber 39 then flows out into the external coolant circuit to flow back into the motor housing 35. An enclosed compressor refers to the rotating electric machine M being enclosed in a container integrally welded with the compressor 30.

The rotating electric machine M of the present invention is superior in that it has low pulsation (low vibration) and is suitable for application to the enclosed electric compressor 30. The demand for reducing noise and vibration without lowering the average value of the output torque is strong for vehicle enclosed electric compressors. The permanent magnet embedment rotating electric machine M satisfies such demands.

(5) The winding method of the stator may also be distributed winding wherein the same advantages can be achieved also in such an instance.

(6) The present invention is also applicable to rotating electric machines employing concentrated winding such as 6-pole 9-slots wherein the same advantages can be achieved also in such an instance.

The invention claimed is:

1. A permanent magnet embedment rotating electric machine, comprising:
an annular stator;
a plurality of teeth arranged on an inner circumference of the stator, a slot is defined between each adjacent pair of the teeth;
a plurality of coils, each coil being arranged in one of the slots;
a rotor located inside of the stator, the rotor defining a rotational axis, a virtual circumferential surface about the rotational axis, and an outer circumference, wherein the outer circumference has a plurality of circumferential portions, the circumferential portions being included in the virtual circumferential surface, and each of the circumferential portion defining an angular width A and a radius R relative to the rotational axis;
a plurality of permanent magnets embedded inside the rotor, the permanent magnets defining a number of poles p, each of the permanent magnets having a magnetic pole center, wherein each of the circumferential portions corresponds to the magnetic pole center, and wherein the circumferential portions, which correspond to the permanent magnets, respectively, are spaced from each other; and
a plurality of convex portions located inside of the virtual circumferential surface, each convex portion connecting an adjacent pair of the circumferential portions with each other, each convex portion being an arcuate curve bulging radially outward, wherein each convex portion defines a minimum radius, which is a minimum value of a distance between the rotational axis and the convex portion, wherein the difference between the radius R and the minimum radius is a depth Dh, where $Dhr = Dh \times 25.5/R$, and wherein the range of the angular width A and the range of the depth Dh are set by the following expression, $$(5.6 \times Dhr + 11.3)° \times 6/p \leq A < 35° \times 6/p$$

and $$A < [360/p - 2 \times \arccos(1 - Dhr/25.5)]° \quad (1).$$

2. The rotating electric machine according to claim 1, wherein the rotor includes:
a plurality of accommodating holes for accommodating the respective permanent magnets, the accommodating holes including a first accommodating hole and a second accommodating hole, which are adjacent to each other;
a first minimum spacing defining the minimum spacing between a first accommodating hole and the convex portion, wherein the first minimum spacing has a first initial point that is adjacent to the first accommodating hole; and
a second minimum spacing defining a minimum spacing between the second accommodating hole and the convex portion, wherein the second minimum spacing has a second initial point that is adjacent to the second accommodating hole,
wherein the first initial point and the second initial point define an inter-bridge angle $\Theta b$ in relation to the rotational axis, wherein the range of the inter-bridge angle $\Theta b$ is set by the expression: $0 < \Theta b \leq 10°$.

3. The rotating electric machine according to claim 1, wherein the permanent magnets are located so as to alternately have different polarities in the circumferential direction.

4. The rotating electric machine according to claim 1, wherein the slots are arranged at an equal pitch in the circumferential direction of the stator.

5. The rotating electric machine according to claim 1, wherein the circumferential portions are arranged at an equal pitch in the circumferential direction of the stator.

6. The rotating electric machine according to claim 1, wherein the rotor has a magnetic pole switching part located between an adjacent pair of the permanent magnets, and
wherein a gap between the outer circumference of the rotor and the teeth is largest at a portion corresponding to the magnetic pole switching part.

7. The rotating electric machine according to claim 1, wherein the coils are wound about the stator into a wave winding.

8. The rotating electric machine according to claim 1, wherein the number of poles p is set to six.

9. The rotating electric machine according to claim 1, wherein the number of the slots is set to eighteen.

10. The rotating electric machine according to claim 1, wherein the rotor defines a radial line that extends in a radial direction from the rotational axis, and
wherein the permanent magnets are each formed as a flat plate that is perpendicular to the radial line.

11. The rotating electric machine according to claim 1, wherein the distances between the permanent magnets and the rotational axis are equal to each other.

12. A permanent magnet embedment rotating electric machine, comprising:
an annular stator;

a plurality of teeth arranged on an inner circumference of the stator, a slot is defined between each adjacent pair of the teeth;

a plurality of coils, each coil being arranged in one of the slots;

a rotor located inside of the stator, the rotor defining a rotational axis, a virtual circumferential surface about the rotational axis, and an outer circumference, wherein the outer circumference has a plurality of circumferential portions, the circumferential portions being included in the virtual circumferential surface, and each of the circumferential portions defining a radius R relative to the rotational axis;

a plurality of permanent magnets embedded inside the rotor, each of the permanent magnets having a magnetic pole center, wherein each of the circumferential portions corresponds to the magnetic pole center, and wherein the circumferential portions, which correspond to the permanent magnets, respectively, are spaced from each other; and a plurality of convex portions located inside of the virtual circumferential surface, each convex portion connecting an adjacent pair of the circumferential portions with each other, each convex portion being an arcuate curve bulging radially outward, wherein each convex portion defines a minimum radius, which is a minimum value of a distance between the convex portion and the rotational axis, wherein the difference between the radius R and the minimum radius is a depth Dh, where Dhr=Dh×25.5/R, and wherein the range of the depth Dh is set by the following expression: $0 < Dhr \leq 1$ mm.

13. The rotating electric machine according to claim 2, wherein each of the circumferential portions define an angular width A in relation to the rotational axis, and the permanent magnets define a number of poles p, and wherein the range of the angular width A is set by the expression: $14° \times 6/p \leq A \leq 34° \times 6/p$.

14. The rotating electric machine according to claim 12, wherein each of the circumferential portions define an angular width A in relation to the rotational axis, and the permanent magnets define a number of poles p, and wherein the range of the angular width A is set by the expression: $14° \times 6/p \leq A \leq 34° \times 6/p$.

15. The rotating electric machine according to claim 13, wherein the angular width A is set by the expression: $26° \times 6/p$, and wherein the depth Dhr is set to 0.5 mm.

16. The rotating electric machine according to claim 14, wherein the rotor includes:

a plurality of accommodating holes for accommodating the respective permanent magnets, the accommodating holes including a first accommodating hole and a second accommodating hole, which are adjacent to each other;

a first minimum spacing defining the minimum spacing between a first accommodating hole and the convex portion, wherein the first minimum spacing has a first initial point that is adjacent to the first accommodating hole; and a second minimum spacing defining a minimum spacing between the second accommodating hole and the convex portion, wherein the second minimum spacing has a second initial point that is adjacent to the second accommodating hole, wherein the first initial point and the second initial point define an inter-bridge angle Θb in relation to the rotational axis, and wherein the angular width A is set by the expression $26° \times 6/p$, and the inter-bridge angle Θb is set to 5.2°.

17. The rotating electric machine according to claim 15, wherein the inter-bridge angle Θb is set to 5.2°.

18. The rotating electric machine according to claim 16, wherein the depth Dhr is set to 0.5 mm.

19. A motor for a car air conditioner, wherein the motor includes the rotating electric machine according to claim 1.

20. An enclosed electric compressor, comprising:

the motor according to claim 19;

a rotating shaft driven by the motor;

a compression chamber; and a compression operation body that executes compression of gas in the compression chamber on the basis of rotation of the rotating shaft, thereby compressing and discharging the gas.

* * * * *